US012760848B2

(12) United States Patent
Lin et al.

(10) Patent No.: US 12,760,848 B2
(45) Date of Patent: Oct. 13, 2026

(54) INTEGRATED MAINTENANCE SYSTEM FOR MULTIPHASE METERING SYSTEM

(71) Applicants: Chevron U.S.A. Inc., San Ramon, CA (US); Cactus Measurement, LLC, Richmond, TX (US)

(72) Inventors: Yuanbo Lin, Midland, TX (US); Shuai Tan, Richmond, TX (US)

(73) Assignees: CHEVRON U.S.A. INC., San Ramon, CA (US); CACTUS MEASUREMENT, LLC, Richmond, TX (US)

( * ) Notice: Subject to any disclaimer, the term of this patent is extended or adjusted under 35 U.S.C. 154(b) by 529 days.

(21) Appl. No.: 18/332,506

(22) Filed: Jun. 9, 2023

(65) Prior Publication Data

US 2024/0410533 A1 Dec. 12, 2024

(51) Int. Cl.
*F17D 3/01* (2006.01)
*F17D 3/18* (2006.01)

(52) U.S. Cl.
CPC *F17D 3/01* (2013.01); *F17D 3/18* (2013.01)

(58) Field of Classification Search
CPC ............... F17D 3/01; F17D 3/18; G01F 25/10
See application file for complete search history.

(56) References Cited

U.S. PATENT DOCUMENTS 10,983,513 B1 4/2021 Al Kadem et al.
2009/0158859 A1 6/2009 Huang et al.
2009/0173390 A1* 7/2009 Slupphaug .............. E21B 43/12 137/12
2011/0040485 A1 2/2011 Ong
2011/0315638 A1 12/2011 Kelly et al.
2012/0017697 A1 1/2012 Benzo et al.
2013/0174668 A1 7/2013 Baker et al.
2015/0040658 A1 2/2015 Abyzov et al.
2018/0087954 A1 3/2018 Gonzaga et al.
2018/0252080 A1 9/2018 Vilstrup et al.
2020/0297900 A1* 9/2020 Holigan .............. A61M 3/0258
2020/0319005 A1 10/2020 Folgerø et al.
2021/0262613 A1 8/2021 Mawby et al.
2021/0340869 A1* 11/2021 Syresin ............... E21B 49/0875
(Continued)

FOREIGN PATENT DOCUMENTS

WO WO-2016176596 A1 * 11/2016 ............... G01F 1/66

OTHER PUBLICATIONS

WO-2016176596-A1_translated (Year: 2016).*
(Continued)

*Primary Examiner* — Catherine T. Rastovski
*Assistant Examiner* — Michael J Singletary
(74) *Attorney, Agent, or Firm* — Smith & Woldesenbet Law Group, PLLC

(57) ABSTRACT

A method for maintaining a multiphase metering system (MPMS) may include obtaining a plurality of values associated with a plurality of measurements of a parameter made by a sensor device, wherein the parameter is associated with operation of the MPMS; identifying, based on the plurality of values, an issue with the MPMS; determining a process to resolve the issue with the MPMS; and implementing the process to resolve the issue with the MPMS using a fluid management apparatus coupled to the MPMS.

20 Claims, 9 Drawing Sheets

(56) References Cited

U.S. PATENT DOCUMENTS

| | | | |
|---|---|---|---|
| 2022/0146291 | A1 | 5/2022 | Laumann |
| 2024/0201001 | A1 | 6/2024 | Gomaa et al. |

OTHER PUBLICATIONS

Kari Rodriquez, PCT International Search Report, mailed on Nov. 13, 2024, 2 pages, US as receiving office.
Kari Rodriquez, Written Opinion of the International Search Authority, mailed on Nov. 13, 2024, 7 pages, US as receiving office.
Matos Tania, PCT International Search Report, mailed on Sep. 3, 2024, 3 pages, US as receiving office.
Matos Tania, Written Opinion of the International Search Authority, mailed on Sep. 3, 2024, 9 pages, US as receiving office.

* cited by examiner

INTEGRATED MAINTENANCE SYSTEM FOR MULTIPHASE METERING SYSTEM

TECHNICAL FIELD

The present application is related to subterranean field operations and, more particularly, to integrated maintenance systems for multiphase meters.

BACKGROUND

A multiphase metering system (MPMS) is commonly used in subterranean field operations. A MPMS is capable of measuring multiple phase fluids (e.g., oil, wet gas, dry gas, condensate, water). While using a MPMS, the tapholes that detect the differential pressure (e.g., in the Venturi chamber of certain models of MPMSs) are prone to blockage from deposits (e.g., scale, paraffin etc.), ice that forms due to low temperatures in the environment in which a MPMS is located, hydrate that forms, and/or other foreign agents (e.g., solids such as sands, debris entrained in the stream flowing through the chamber and/or lodged into the tapholes). These blockages can lead to inaccurate readings or even a total loss of differential pressure readings, either of which can result in inaccurate flow rate measurements.

The current solution to overcome these blockages is to manually by-pass the MPMS, and then disassemble the manifold and multivariable transmitter of the MPMS to manually clear the blockages using special flushing tools (e.g., pressurized fluid jets) and/or other tools. This manual process is time consuming and causes large gaps in the continuity of the measurements, monitoring, and data acquisition provided by the MPMS. Further negative impacts of the current solution include, but are not limited to, delayed engineering decisions, high cost of equipment and tools, and potentially undesired operational outcomes due to lack of data while the MPMS is out of service. There are also potential risks associated with the operation of disassembling of the pressurized MPMS, as well as other environmental and safety risks around the field operation while the MPMS is out of service (e.g., potential loss of production fluid into the environment).

SUMMARY

In general, in one aspect, the disclosure relates to a method for maintaining a MPMS. The method can include obtaining a plurality of values associated with a plurality of measurements of a parameter made by a sensor device, where the parameter is associated with operation of the MPMS. The method can also include identifying, based on the plurality of values, an issue with the MPMS. The method can further include determining a process to resolve the issue with the MPMS. The method can also include implementing the process to resolve the issue with the MPMS using a fluid management apparatus coupled to the MPMS.

In another aspect, the disclosure relates to a system for managing a MPMS. The system can include a maintenance system manifold comprising a MPMS interface that is configured to couple to an external interface of the MPMS. The system can also include a fluid management apparatus configured to provide a fluid. The system can further include a maintenance system controller configured to obtain a plurality of values associated with a plurality of measurements of a parameter made by a sensor device, where the parameter is associated with operation of the MPMS. The maintenance system controller can also be configured to identify, based on the plurality of values, an issue with the MPMS. The maintenance system controller can further be configured to determine a method to resolve the issue with the MPMS. The maintenance system controller can also be configured to implement the method to resolve the issue with the MPMS using the fluid management apparatus coupled to the MPMS through the maintenance system manifold.

In yet another aspect, the disclosure relates to an integrated multiphase metering and maintenance system. The integrated multiphase metering and maintenance system can include a MPMS configured to measure single-phase or multiple-phase (e.g., homogenous, non-homogenous) flow. The MPMS can include a sensor device and an external interface. The integrated multiphase metering and maintenance system can also include a maintenance system coupled to the MPMS. The maintenance system can include a maintenance system manifold comprising a MPMS interface that is configured to couple to the external interface of the MPMS. The maintenance system can also include a fluid management apparatus configured to provide a fluid. The maintenance system can further include a maintenance system controller configured to obtain a plurality of values associated with a plurality of measurements of a parameter made by the sensor device of the MPMS, where the parameter is associated with operation of the MPMS. The maintenance system controller can also be configured to identify, based on the plurality of values, an issue with the MPMS. The maintenance system controller can further be configured to determine a method to resolve the issue with the MPMS. The maintenance system controller can also be configured to implement the method to resolve the issue with the MPMS using the fluid management apparatus coupled to the MPMS through the maintenance system manifold.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, the same reference numerals used in different figures may designate like or corresponding but not necessarily identical elements.

DETAILED DESCRIPTION

Figure 1:
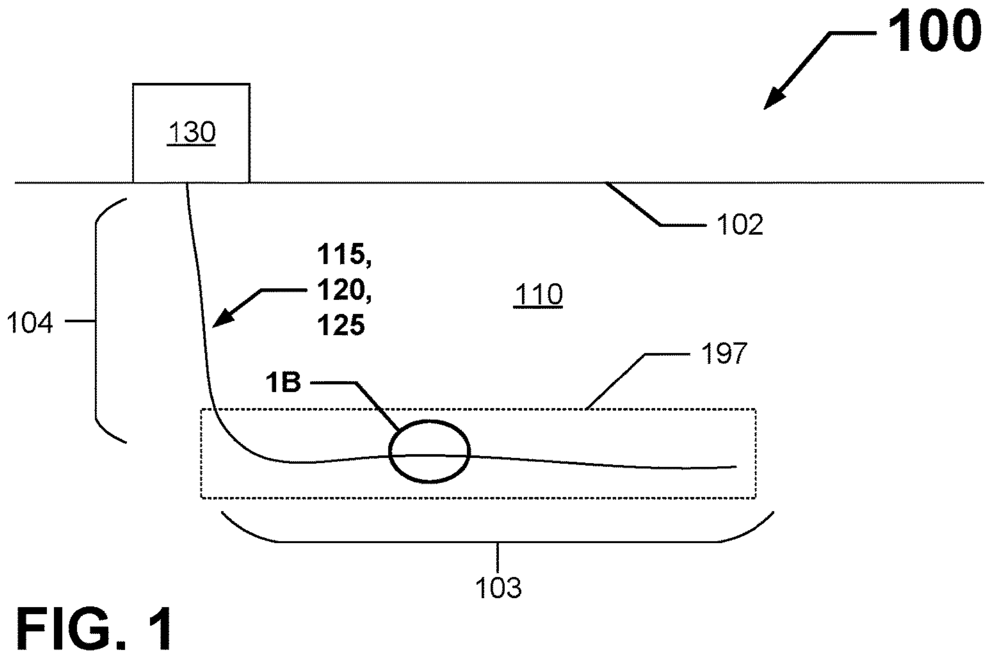
FIG. 1 shows a field system with which example embodiments may be used.

The example embodiments discussed herein are directed to systems, apparatus, methods, and devices for integrated maintenance of a MPMS. The subterranean resources that flow through a MPMS may include, but are not limited to, oil, rock, cuttings, proppant, water, and natural gas. Example maintenance systems integrated into MPMSs may be designed to comply with certain standards and/or requirements. Example maintenance systems may be integrated into new MPMSs and/or retrofit into existing MPMSs. Example maintenance systems may be used subsea and/or on land. Example embodiments may be used with MPMSs during any type of field operation, including but not limited to production operations and injection operations.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, hydrocarbon composition, reservoir location, pressure, etc. Those of ordinary skill in the art will appreciate that the characteristics are many, including, but not limited to: conventional (e.g., oil or gas in discrete accumulations or pools, rock formations with high porosity and permeability), shale gas, shale oil, tight gas, tight oil, tight carbonate, carbonate, vuggy carbonate, tight sand, unconventional (e.g., a permeability of less than 25 millidarcy (mD) such as a permeability of from 0.000001 mD to 25 mD)), diatomite, geothermal, mineral, etc. The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for exploration, injection, and/or recovery of resources. A plurality of wells (e.g., tens to hundreds of wells) or a plurality of wellbores are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include a plurality of components, such as, but not limited to, a casing, a liner, a tubing string, a sensor, a packer, a screen, a gravel pack, artificial lift equipment (e.g., an electric submersible pump (ESP), gas lift, rod pump, jet pump, progressive cavity pump), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof. In some embodiments, the same control devices may be used to control fluid flow into and/or out of the well. In some embodiments, different control devices may be used to control fluid flow into and/or out of a well. In some embodiments, the rate of flow of fluids through the well may depend on the fluid handling capacities of the surface facility that is in fluidic communication with the well. The equipment to be used in controlling fluid flow into and/or out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" is not limited to any description or configuration described herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system for maintaining a MPMS) can be made of one or more of a number of suitable materials, including but not limited to metal (e.g., stainless steel), ceramic, rubber, glass, and plastic.

A coupling feature (including a complementary coupling feature) as described herein can allow one or more components and/or portions of a system used in a field operation, including an example system for maintaining a MPMS, to become mechanically coupled, directly or indirectly, to another portion and/or component of the system used in the field operation. A coupling feature can include, but is not limited to, a portion of a hinge, an aperture, a recessed area, a protrusion, a slot, a spring clip, a tab, a detent, and mating threads. One portion of a system used in a field operation can be coupled to another portion and/or component of the system by the direct use of one or more coupling features.

In addition, or in the alternative, a portion of an example system used in a field operation, including an example system for maintaining a MPMS, can be coupled to another portion of the system using one or more independent devices that interact with one or more coupling features disposed on a component of the system. Examples of such devices can include, but are not limited to, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

When used in certain systems (e.g., for certain field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA). Also, as discussed above, example systems for maintaining a MPMS can be used in hazardous environments, and so example systems for maintaining a MPMS can be designed to comply with industry standards that apply to hazardous environments.

If a component of a figure is described but not expressly shown or labeled in that figure, the label used for a corresponding component in another figure may be inferred to that component. Conversely, if a component in a figure is labeled but not described, the description for such component may be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of integrated maintenance of a MPMS are described more fully hereinafter with reference to the accompanying drawings, in which example embodiments of integrated maintenance of a MPMS are shown. Integrated maintenance of a MPMS may, however, be embodied in many different forms and should not be construed as limited to the example embodiments set forth herein. Rather, these example embodiments are provided so that this disclosure will be thorough and complete, and will fully convey the scope of integrated maintenance of a MPMS to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of integrated maintenance of a MPMS. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 100 with a subterranean wellbore 120 in which example embodiments may be used. The wellbore 120 of the field system 100 in this example is bounded by a wall in the subterranean formation 110 and formed using field equipment 130. The field equipment 130 may be located above a surface 102, and/or within the wellbore 120. The surface 102 may be ground level for an on-shore application (as in this case) and the sea floor for an off-shore application. The point where the wellbore 120 begins at the surface 102 may be called the entry point.

The subterranean formation 110 may include one or more of a number of formation types, including but not limited to shale, limestone, sandstone, clay, sand, and salt. In certain embodiments, some or all of the subterranean formation 110 may be unconventional as that term is known by those of ordinary skill in the art. For example, a subterranean formation 110 that is unconventional has a permeability and/or porosity that is so low that the subterranean resource (e.g., oil, natural gas) cannot be extracted economically through a vertical section 104 of the wellbore 120 and instead requires a horizontal section 103 of the wellbore 120 that is subjected to fracturing operations. The subterranean formation 110 may include one or more reservoirs in which one or more subterranean resources (e.g., oil, gas, water, steam) may be located. One or more of a number of field operations (e.g., fracturing, coring, tripping, drilling, setting casing, cementing, production, wireline) may be performed using the field equipment 130 to reach an objective of a user with respect to the subterranean formation 110.

The wellbore 120 may have one or more of a number of segments, where each segment may have one or more of a number of dimensions. Examples of such dimensions may include, but are not limited to, size (e.g., diameter) of the wellbore 120, a curvature of the wellbore 120, a true vertical depth of the wellbore 120, a measured depth of the wellbore 120, a vertical (or substantially vertical) section 104 of the wellbore 120, a horizontal (or substantially horizontal) section 103 of the wellbore 120, and a horizontal displacement of the wellbore 120. The wellbore 120 is drilled in such a way that the wellbore 120 is positioned within one or more zones of interest 197, in which one or more subterranean resources are located within the subterranean formation 110. The field equipment 130 may be used to create (e.g., drill) and/or develop (e.g., insert casing pipe, extract downhole materials) the wellbore 120. The field equipment 130 may be positioned and/or assembled at the surface 102. The field equipment 130 may include, but is not limited to, a production system, an injection system, a derrick, a tool pusher, a clamp, a tong, drill pipe, a drill bit, pumps, compressors, mudlogging equipment, a power source, and a casing string 125.

The field equipment 130 may also include one or more devices that measure and/or control various aspects (e.g., direction of wellbore 120, pressure, temperature) of a field operation associated with the wellbore 120. For example, the field equipment 130 may include a wireline tool that is run through the wellbore 120 to provide detailed information (e.g., curvature, azimuth, inclination) throughout the wellbore 120. Such information may be used for one or more of a number of purposes. For example, such information may dictate the size (e.g., outer diameter) of casing pipe (part of the casing string 125) to be inserted at a certain depth in the wellbore 120.

Inserted into and disposed within the wellbore 120 of FIG. 1 are a number of casing pipes that are coupled to each other end-to-end to form the casing string 125. In this case, each end of a casing pipe has mating threads (a type of coupling feature) disposed thereon, allowing a casing pipe to be mechanically coupled to an adjacent casing pipe in an end-to-end configuration. The casing pipes of the casing string 125 may be mechanically coupled to each other directly or using a coupling device, such as a coupling sleeve. In some cases, the casing string 125 is not disposed in the entire wellbore 120. For example, the casing string 125 may be disposed from approximately the surface 102 to some other point in the wellbore 120, leaving an open hole portion of the wellbore 120 extends beyond the casing string 125 at the distal end of the wellbore 120.

Each casing pipe of the casing string 125 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the cross-sectional shape of the casing pipe is circular, the width may refer to an outer diameter, an inner diameter, and/or some other form of measurement of the casing pipe. Examples of a width in terms of an outer diameter of a casing pipe may include, but are not limited to, 7 inches, 7⅝ inches, 8⅝ inches, 9⅝ inches, 9⅞ inches, 10¾ inches, 13⅜ inches, and 14 inches.

The size (e.g., width, length) of the casing string 125 may be based on the information gathered using field equipment 130 with respect to the wellbore 120. The walls of the casing string 125 have an inner surface that forms a cavity that traverses the length of the casing string 125. Each casing pipe may be made of one or more of a number of suitable materials, including but not limited to stainless steel. Cement is poured into the wellbore 120 (e.g., through the cavity and then forced upward between the outer surface of the casing string 125 and the wall of the wellbore 120) to adhere the casing string 125 to the wall of the subterranean formation 110. In some cases, a liner may additionally be used with, or alternatively be used in place of, some or all of the casing pipes in the casing string 125.

In some cases, as with a wellbore 120 that is used for injection, a number of tubing pipes that are coupled to each other and inserted inside the cavity formed by the casing string 125 to form a tubing string 115. The tubing pipes of the tubing string 115 are mechanically coupled to each other end-to-end, usually with mating threads (a type of coupling feature). The tubing pipes of the tubing string 115 may be mechanically coupled to each other directly or using a coupling device, such as a coupling sleeve.

Each tubing pipe of the tubing string 115 may have a length and a width (e.g., outer diameter). The length of a tubing pipe may vary. For example, a common length of a tubing pipe is approximately 30 feet. The length of a tubing pipe may be longer (e.g., 40 feet) or shorter (e.g., 10 feet) than 30 feet. Also, the length of a tubing pipe may be the same as, or different than, the length of a casing pipe of the casing string 125. The width of a tubing pipe may also vary and may depend on one or more of a number of factors, including but not limited to the target depth of the wellbore 120, the total length of the wellbore 120, a desired flow rate of a fluid therethrough for injection, the inner diameter of the adjacent casing pipe, and the curvature of the wellbore 120.

The width of a tubing pipe may refer to an outer diameter, an inner diameter, and/or some other form of measurement of the tubing pipe. Examples of a width in terms of an outer diameter for a tubing pipe may include, but are not limited to, 7 inches, 5 inches, and 4 inches. The outer diameter of the tubing pipe may be less than the inner diameter of the adjacent casing pipe of the casing string 125, resulting in a gap (also called an annulus) between the tubing string 115 and the adjacent casing string 125. The walls of the tubing pipe have an inner surface that forms a cavity that traverses the length of the tubing string 115. The tubing pipe may be made of one or more of a number of suitable materials, including but not limited to steel.

While not shown in FIG. 1, there may be multiple wellbores 120, each with its own wellhead but that is located close to the other wellheads, drilled into the subterranean formation 110 and having substantially vertical sections 104 and/or substantially horizontal sections 103 that are close to each other. In such a case, the multiple wellbores 120 may be drilled at the same pad or at different pads. When the drilling process is complete, other operations, such as fracturing operations and production operations, may be performed. A fracturing operation may enhance existing fractures in the subterranean formation 110 and/or create new fractures in the subterranean formation 110. Examples of other operations used with example embodiments may include injection operations.

In some cases, one or more sensor devices can be installed at some point in the wellbore 120. For example, a sensor device can be positioned at an inflow point of the well 120, (e.g., where the fractures meet the casing string 125 and the wellbore 120). In certain example embodiments, one or more of such sensor devices can be part of a MPMS. An example of sensor devices and a MPMS are discussed in more detail below.

Figure 2:
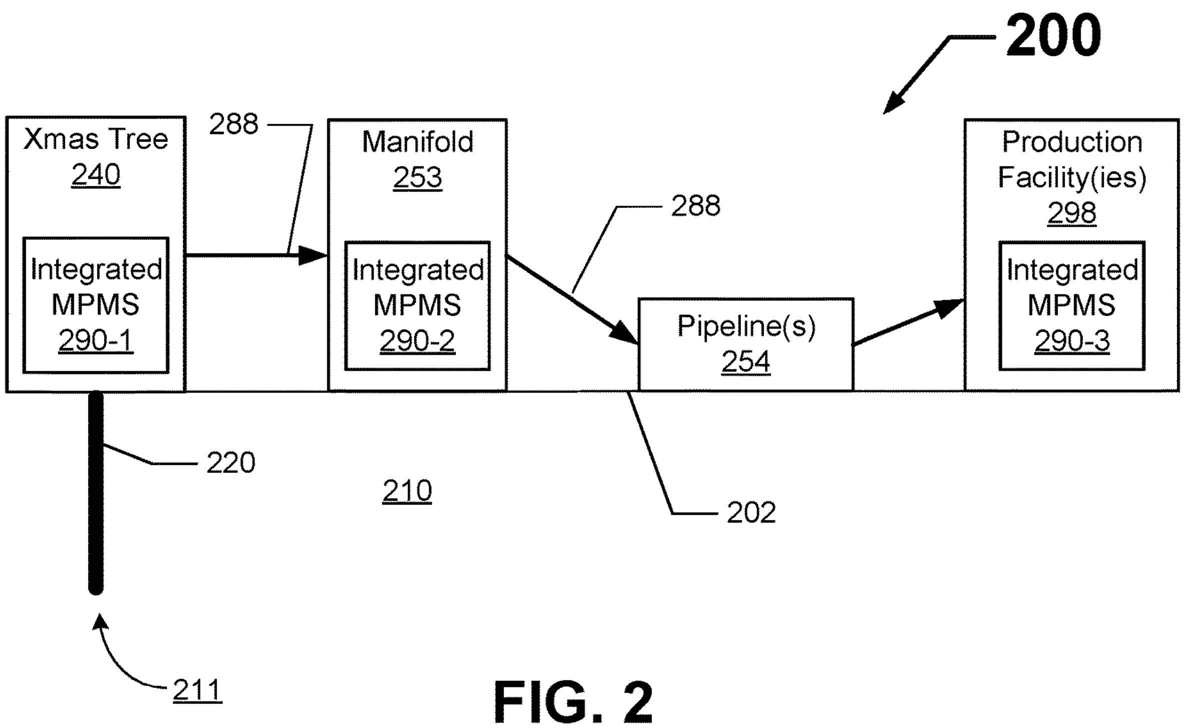
FIG. 2 shows a diagram of a land-based field system that includes a production well with which example embodiments may be used.

FIG. 2 shows a diagram of a land-based field system 200 that includes a production well 220 with which example embodiments may be used. Referring to FIGS. 1 and 2, the field system 200 of FIG. 2 includes a Xmas tree 240, a manifold 253, one or more production facilities 298, pipelines 254, piping 288, and one or more integrated MPMSs 290. To extract a subterranean resource 211 from a wellbore 220 on production in a subterranean formation 210 (substantially similar to the subterranean formation 110 discussed above), the Xmas tree 240 is disposed toward the top of the wellbore 220 at the surface 202. In this case, the Xmas tree 240 includes an integrated MPMS 290-1. Piping 288 transfers the subterranean resource 211 (substantially similar to the subterranean resource discussed above) from the Xmas tree 240 to the manifold 253, which includes its own integrated MPMS 290-2. Additional piping 288 transfers the subterranean resource 211 from the manifold 253 to one or more pipelines 254, which terminate at one or more production facilities 298. The production facility 298 in this example includes its own integrated MPMS 290-3. With other types of field operations (e.g., injection wells), the process is reversed. There can be one or more of a number of components and/or systems (e.g., a pump, a compressor, a process cooler, a tank, a vessel, a separator) positioned between the Xmas tree 240 and the pipelines 254 to assist in extracting the subterranean resource 211.

The Xmas tree 240 is a stack of vertical and horizontal valves, spools, pressure gauges, chokes, and/or other components installed as an assembly on a wellhead. The Xmas tree 240 is configured to provide a controllable interface between the wellbore 220 and production facilities (e.g., via the pipeline 254). The various valves (including the example integrated MPMS 290-1) of the Xmas tree 240 can be used for such purposes as testing, servicing, regulating, and/or choking the stream of produced subterranean resources 211 coming up from the wellbore 220. The Xmas tree 240 is located on or just above the surface 202.

The manifold 253 is an assembly of headers, pipes (e.g., pipes 288) and valves (including the example integrated MPMS 290-2). The manifold 253 is configured to transfer the subterranean resources 211 from the Xmas tree 240 to one or more of the pipelines 254. In some ways, the manifold 253 acts as a type of flow regulator to distribute the subterranean resource 211 among the various pipelines 254. Similarly, if there are multiple wellbores 220, as from a common pad, the manifold 253 can receive the subterranean resource 211 from one or more of those wellbores 220 and distribute the subterranean resource 211 to one or more of the pipelines 254. The manifold 253 is located on or just above the surface 202.

Each pipeline 254 (also sometimes called a submarine pipeline 254) is a series of pipes, coupled end to end, that is laid at or near to the surface 202. A pipeline 254 moves the subterranean resource 211 from the area of the wellbore 220 to some other location, typically for a midstream process (e.g., oil refining, natural gas processing). The piping 288, also located subsea, can include multiple pipes, ducts, elbows, joints, sleeves, collars, and similar components that are coupled to each other (e.g., using coupling features such as mating threads) to establish a network for transporting the subterranean resource 211 from the Xmas tree 240, through the manifold 253, to one or more of the pipelines 254. Each component of the piping 288 can have an appropriate size (e.g., inner diameter, outer diameter) and be made of an appropriate material (e.g., steel) to safely and efficiently handle the pressure, temperature, flow rate, and other characteristics of the subterranean resource 211.

Each production facility 298 is a production site that includes equipment for the production of oil, gas, and/or other subterranean resources 211. The equipment at a production facility 298 may perform one or more of a number of functions, including but not limited to separation, treatment, processing, refining, compressing, transferring, testing, measuring, support of production operations, and storage. A production facility 298 may be located close to one or more transportation mediums (e.g., shipping, rail, interstate highways, pipeline terminals). A production facility 298 may include pipes (e.g., pipes 288) and valves (including the example integrated MPMS 290-3). More details about the example MPMSs 290 of FIG. 2 are discussed below.

Figure 3:
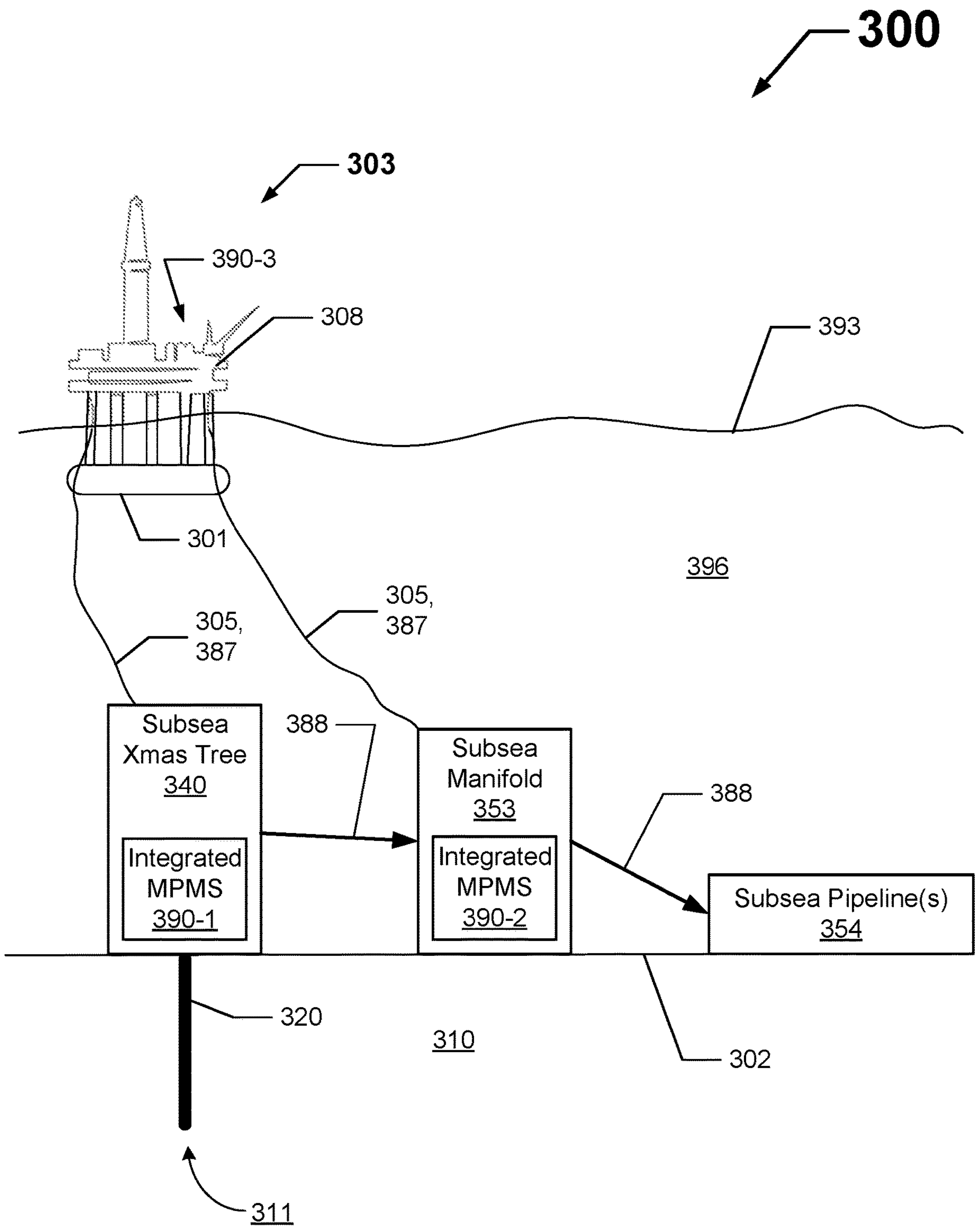
FIG. 3 shows a diagram of a subsea field system that includes a subsea production well with which example embodiments may be used.

FIG. 3 shows a diagram of a subsea field system 300 that includes a production well 320 with which example embodiments may be used. Referring to FIGS. 1 through 3, the field system 300 of FIG. 3 includes a floating structure 303 in the form of a semi-submersible platform that floats in a large and deep body of water 396. Part (e.g., the topsides 308) of the floating structure 303 is above the water line 393, and at least part (e.g., part of the hull 301) of the rest of the floating structure 303 is in the water 396 below the water line 393. The floating structure 303 in this case is used for subterranean field operations (e.g., production, injection) to extract one or more subterranean resources 311 (substantially the same as the subterranean resources discussed above) from and/or inject resources (e.g., carbon dioxide, carbon monoxide, water, hydrocarbon, chemicals) into the subterranean formation 310 (substantially the same as the subterranean formations discussed above) via a wellbore 320 (substantially the same as the wellbores discussed above).

In alternative embodiments, as when a subsea operation is close to land, as in FIG. 2, the structure 303 can be land-based rather than floating. To extract a subterranean resource 311 from a wellbore 320 on production, a Xmas tree 340 with an example integrated MPMS 390-1 is disposed toward the top of the wellbore 320 at the seabed 302. Piping 388 transfers the subterranean resource 311 from the Xmas tree 340 to a manifold 353, which includes its own example integrated MPMS 390-2. In addition, or in alternative embodiments, one or more integrated MPMSs 390 can be located on or proximate to the topsides 308 of the floating structure 303. Additional piping 388 transfers the subterranean resource 311 from the manifold 353 to one or more pipelines 354. There can be one or more of a number of components and/or systems (e.g., a pump, a compressor, a process cooler) positioned between a Xmas tree 340 and the pipelines 354 to assist in extracting the subterranean resource 311. There can be one or more communication links 305 and/or power transfer links 387 between one or more of the components (e.g., the Xmas tree 340, the manifold 353, one or more of the pipelines 354) and one or more components (e.g., a generator, a controller, an example integrated MPMS 390-3) disposed on the topsides 308 of the floating structure 303 (or land-based structure 303, as the case may be).

The subsea Xmas tree 340, the subsea manifold 353, the subsea pipelines 354, the integrated MPMSs 390, and the piping 388 can be substantially the same as the Xmas tree 240, the manifold 253, the pipelines 254, the integrated MPMSs 290, and the piping 288 discussed above with respect to FIG. 2. More details about the example MPMSs 390 of FIG. 3 are discussed below. With other types of field operations (e.g., injection wells), the process is reversed.

Each communication link 305 can include wired and/or wireless technology. Examples of wired technologies may include, but are not limited to, Class 1 electrical cables, electrical connectors, Power Line Carrier, RS485, RS232, and Ethernet. Examples of wireless technologies may include, but are not limited to, sound or pressure waves in the water 396, Wi-Fi, Zigbee, visible light communication, cellular networking, Bluetooth, Bluetooth Low Energy (BLE), ultrawide band (UWB), WirelessHART, ISA100. A communication link 305 can transmit signals (e.g., communication signals, control signals, data) from one component (e.g., a controller) of the field system 300 to another (e.g., a valve on the Christmas tree 340).

Each power transfer link 387 can include one or more electrical conductors, which can be individual or part of one or more electrical cables. In some cases, as with inductive power, power can be transferred wirelessly using power transfer links 387. A power transfer link 387 can transmit power from one component (e.g., a battery, a generator) of the system 300 to another (e.g., a motor on the manifold 353). Each power transfer link 387 can be sized (e.g., 12 gauge, 18 gauge, 4 gauge) in a manner suitable for the amount (e.g., 480V, 24V, 120V) and type (e.g., alternating current, direct current) of power transferred therethrough. In this case, the communication links 305 and the power transfer links 387 are in the form of electrical cables.

Figure 4:
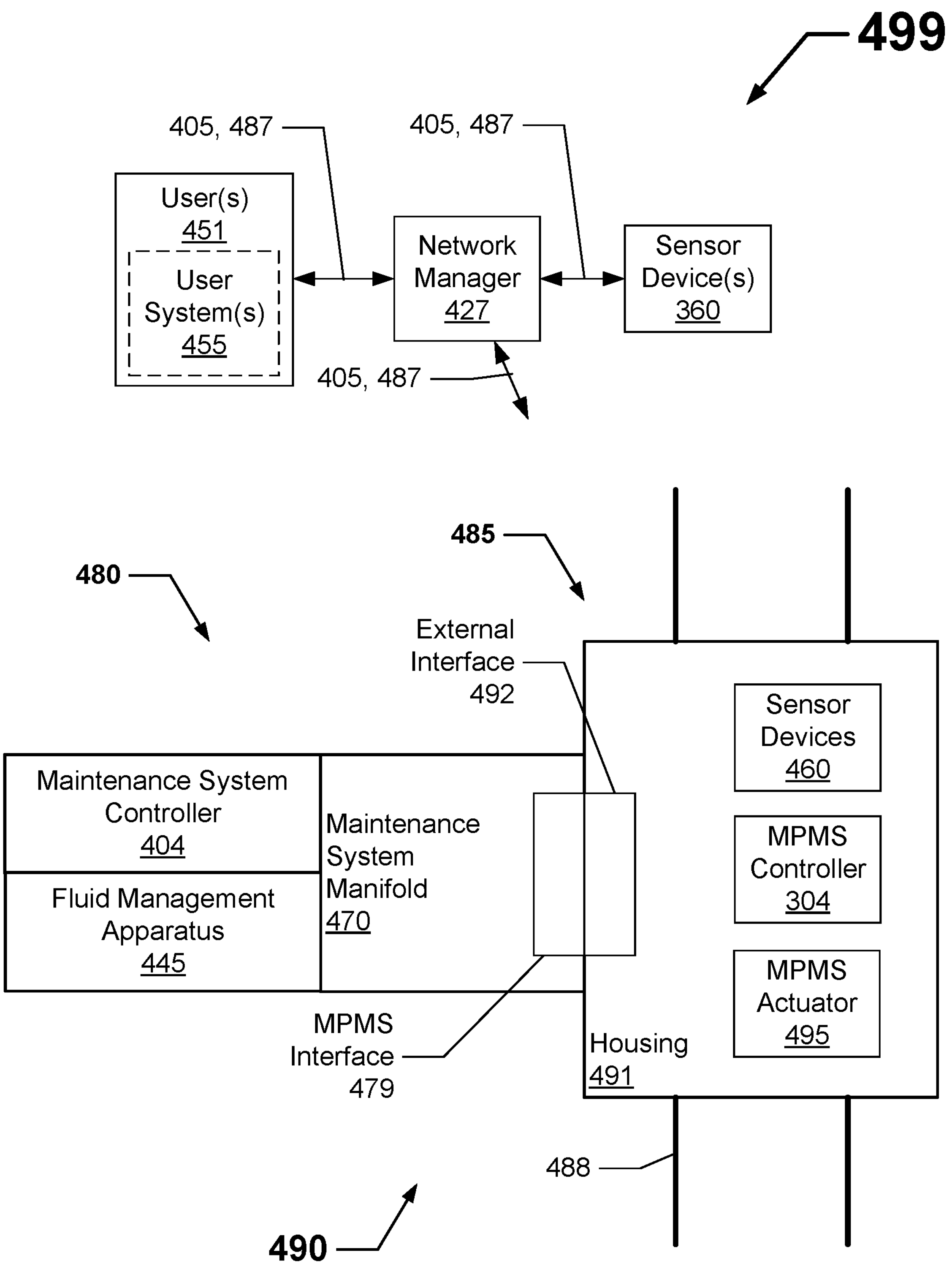
FIG. 4 shows a diagram of a subsystem that includes an example integrated MPMS according to certain example embodiments.
Figure 5:
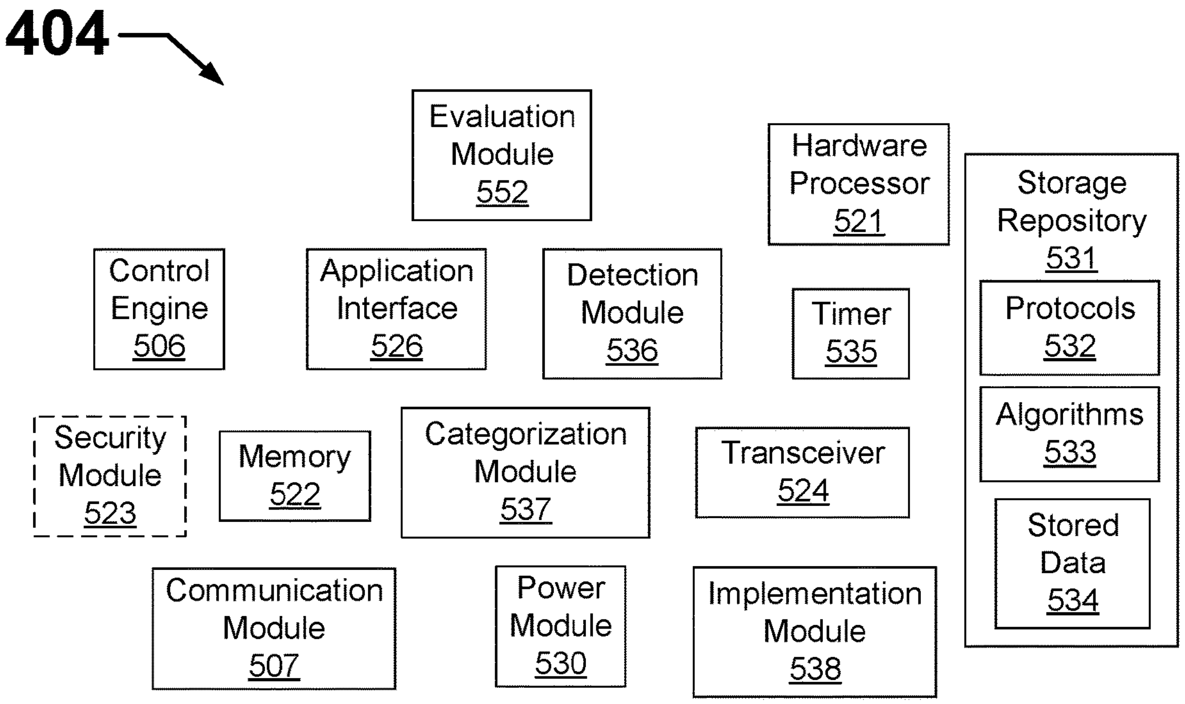
FIG. 5 shows a diagram of the management system controller of the maintenance system of the integrated MPMS of FIG. 4 according to certain example embodiments.
Figure 6:
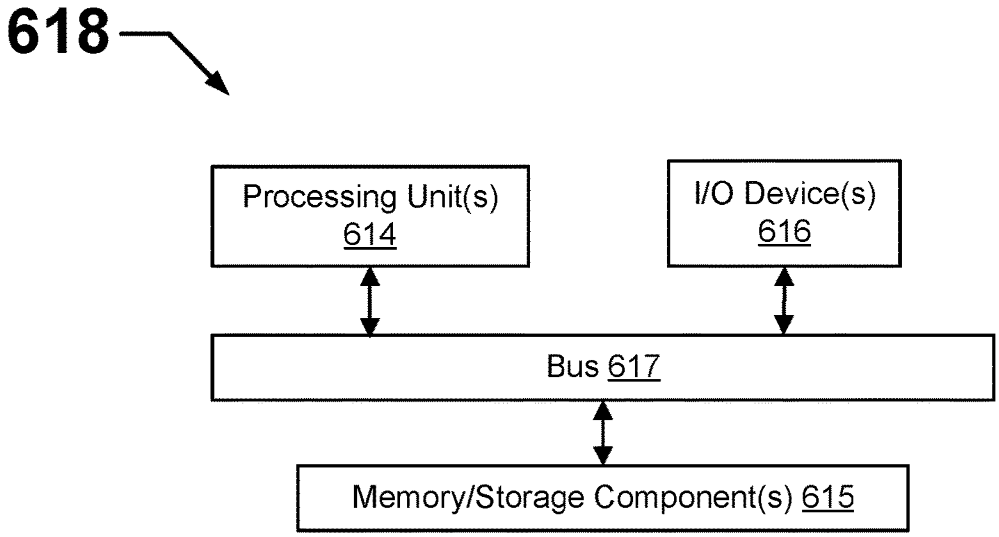
FIG. 6 shows a computing device in accordance with certain example embodiments.
Figure 7:
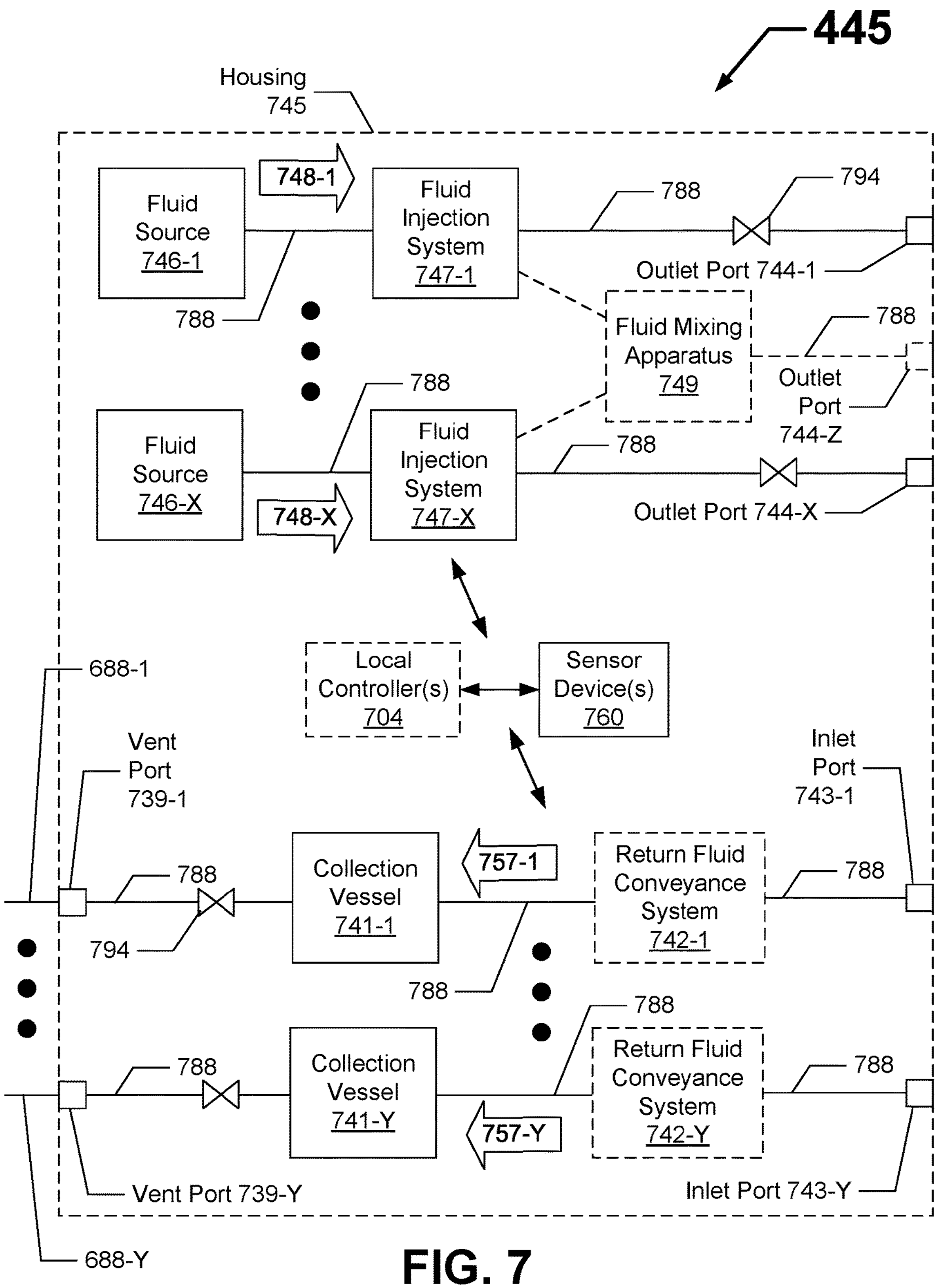
FIG. 7 shows a system diagram of the fluid management apparatus of the maintenance system of the integrated MPMS of FIG. 4 according to certain example embodiments.
Figure 8:
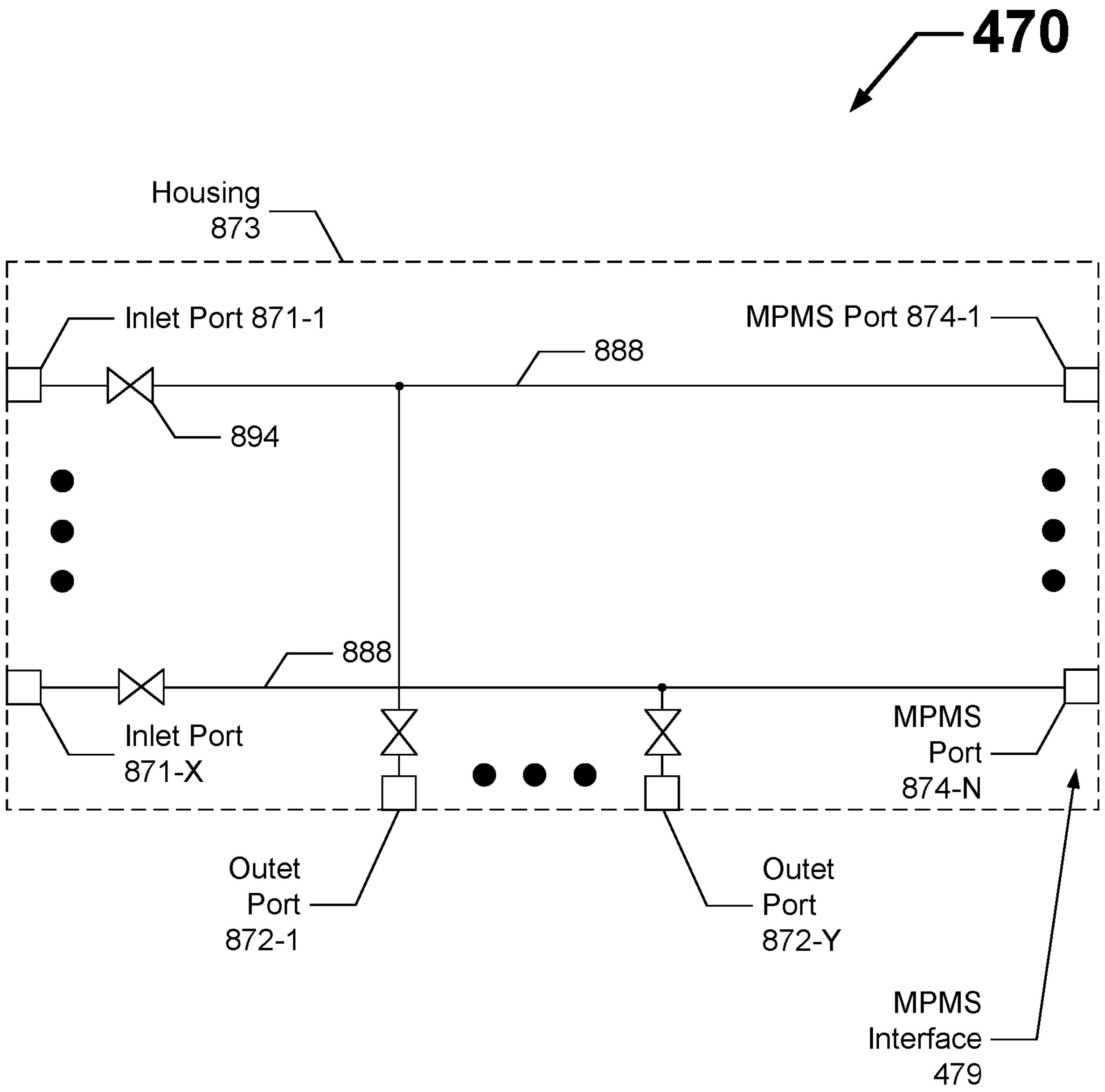
FIG. 8 shows a system diagram of the maintenance system manifold of the maintenance system of the integrated MPMS of FIG. 4 according to certain example embodiments.

FIG. 4 shows a diagram of a subsystem 499 that includes an example integrated MPMS 490 according to certain example embodiments. FIG. 5 shows a diagram of the management system controller 404 of the maintenance system 480 of the integrated MPMS 490 of FIG. 4 according to certain example embodiments. FIG. 6 shows a computing device 618 in accordance with certain example embodiments. FIG. 7 shows a system diagram of the fluid management apparatus 445 of the maintenance system 480 of the integrated MPMS 490 of FIG. 4 according to certain example embodiments. FIG. 8 shows a system diagram of the maintenance system manifold 470 of the maintenance system 480 of the integrated MPMS 490 of FIG. 4 according to certain example embodiments.

Referring to FIGS. 1 through 8, the subsystem 499 of FIG. 4 includes the example integrated MPMS 490, piping 488, one or more sensor devices 360, one or more users 451 (including one or more optional user systems 455), and a network manager 427. The example integrated MPMS 490 includes a MPMS 485 currently known in the art and the example maintenance system 480. The MPMS 485 includes one or more sensor devices 460, a MPMS controller 304, and a MPMS actuator 495. The example maintenance system 480 in this case includes the maintenance system controller 404, the fluid management apparatus 445, and the maintenance system manifold 470.

The subsystem 499 can include other components (e.g., a mud circulation system, a fracturing system, a production system) that are not shown in FIG. 4 but are considered part of the subsystem 499. The components shown in FIG. 4 are not exhaustive, and in some embodiments, one or more of the components shown in FIG. 4 may not be included in the example subsystem 499. Any component of the subsystem 499 may be discrete or combined with one or more other components of the subsystem 499. Also, one or more components of the subsystem 499 may have different configurations. For example, one or more sensor devices 460 may be disposed within or disposed on other components (e.g., piping, a valve). As another example, the maintenance system controller 404, rather than being a stand-alone component of the example maintenance system 480, may be part of one or more other components of the maintenance system 480 and/or one or more other components of the subsystem 499.

The example maintenance system 480 of the integrated MPMS 490 is configured to identify situations where maintenance in the form of cleaning of the lines, nozzles, channels, tapholes, and/or other elements of the MPMS 485 that are subject to blockage, clogging, and/or other types of obstruction is needed. The example maintenance system 480 can operate autonomously and automatically, without the need for direction or instruction from a user 451, a controller (e.g., the MPMS controller 304), the network manager 427, and/or another component of the subsystem 499 or a larger system (e.g., system 100, system 300). In certain example embodiments, the MPMS 485 has no alterations or is minimally altered relative to what is currently used in the art. For example, the MPMS 485 can include an external interface 492 to which the example maintenance system 480 can be coupled and have one or more fluids flow therethrough.

The maintenance system controller 404 of the example maintenance system 480 can include one or more of a number of components. For example, in this case, as shown in FIG. 5, the maintenance system controller 404 can include a control engine 506, a detection module 536, a categorization module 537, an implementation module 538, an evaluation module 552, a communication module 507, a timer 535, a power module 530, a storage repository 531, a hardware processor 521, a memory 522, a transceiver 524, an application interface 526, and, optionally, a security module 523. The various components of the maintenance system controller 404 (also more simply referred to as the controller 404 herein) may be centrally located. In addition, or in the alternative, some of the components of the controller 404 may be located remotely from (e.g., in the cloud, at an office building) one or more of the other components of the controller 404.

The storage repository 531 may be a persistent storage device (or set of devices) that stores software and data used to assist the controller 404 in communicating with one or more other components of a system, such as the users 451 (including associated user systems 455), the network manager 427, the sensor devices 460, the MPMS controller 304, and any other component of the subsystem 499 of FIG. 4 above. In one or more example embodiments, the storage repository 531 stores one or more protocols 532, one or more algorithms 533, and stored data 534.

The protocols 532 of the storage repository 531 may be any procedures (e.g., a series of method steps) and/or other similar operational processes that the control engine 506 of the controller 404 follows based on certain conditions at a point in time. The protocols 532 may include any of a number of communication protocols that are used to send and/or obtain data between the controller 404 and other components of a system or portions thereof (e.g., the subsystem 499). Such protocols 532 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 532 may provide a layer of security to the data transferred within a system or portion thereof (e.g., the subsystem 499). Other protocols 532 used for communication may be associated with the use of Wi-Fi. Zigbee, visible light communication (VLC), cellular networking, BLE, UWB, and Bluetooth.

The algorithms 533 may be any formulas, mathematical models, forecasts, simulations, and/or other similar tools that the control engine 506 of the controller 404 uses to reach a computational conclusion. For example, one or more algorithms 533 may be used, in conjunction with one or more protocols 532, to assist the controller 404 to obtain multiple values associated with measurements of a parameter (e.g., flow rate, temperature, pressure) made by a sensor device 460, where the parameter is associated with operation of the MPMS 485. As another example, one or more algorithms 533 may be used, in conjunction with one or more protocols 532, to assist the controller 404 to identify an issue with the MPMS 485.

As yet another example, one or more algorithms 533 may be used, in conjunction with one or more protocols 532, to assist the controller 404 to determine a method (also sometimes called a process herein) to resolve the issue with the MPMS 485. As still another example, one or more algorithms 533 may be used, in conjunction with one or more protocols 532, to assist the controller 404 to implement the method or process to resolve the issue with the MPMS 485 (e.g., using the fluid management apparatus 445) coupled to the MPMS 485.

An example of an algorithm 533 is a function or model that outputs a curve or table used to represent or indicate a blockage in the MPMS 485. Another example of an algorithm 533 is a function or model that outputs a deviation (e.g., a percentage) between actual values and a curve or table generated by another algorithm 533 to represent forecast or expected values. Yet another example of an algorithm 533 is a function or model that outputs a moving average of pressure, flow rate, and/or some other parameter over a period of time.

Stored data 534 may be any data associated with a the MPMS 485 (e.g., normal operating temperatures, normal operating pressures (including differential pressures), normal operating flow rates), with a subterranean formation (e.g., subterranean formation 110), the fluids 748 of the fluid management apparatus 445, the various components (e.g., the user systems 455, the MPMS 485), including associated equipment (e.g., motors, pumps, compressors), of the subsystem 499, measurements made by the sensor devices (e.g., sensor devices 460, sensor devices 360), threshold values, tables, results of previously run or calculated algorithms 533, updates to protocols 532, user preferences, and/or any other suitable data. Such stored data 534 may be any type of data, including but not limited to historical data, present data, and future data (e.g., forecasts). The stored data 534 may be associated with some measurement of time derived, for example, from the timer 535.

Examples of a storage repository 531 may include, but are not limited to, a database (or a number of databases), a file system, cloud-based storage, a hard drive, flash memory, some other form of solid-state data storage, or any suitable combination thereof. The storage repository 531 may be located on multiple physical machines, each storing all or a portion of the protocols 532, the algorithms 533, and/or the stored data 534 according to some example embodiments. Each storage unit or device may be physically located in the same or in a different geographic location.

The storage repository 531 may be operatively connected to the control engine 506. In one or more example embodiments, the control engine 506 includes functionality to communicate with the users 451 (including associated user systems 455), the sensor devices 460, the sensor devices 360, the network manager 427, the MPMS controller 304, and/or any other components in the subsystem 499. More specifically, the control engine 506 sends information to and/or obtains information from the storage repository 531 in order to communicate with the users 451 (including associated user systems 455), the sensor devices 460, the sensor devices 360, the MPMS controller 304, the network manager 427, and/or any other components of the subsystem 499. As discussed below, the storage repository 531 may also be operatively connected to the communication module 507 in certain example embodiments.

In certain example embodiments, the control engine 506 of the controller 404 controls the operation of one or more components (e.g., the communication module 507, the timer 535, the transceiver 524) of the controller 404. For example, the control engine 506 may activate the communication module 507 when the communication module 507 is in "sleep" mode and when the communication module 507 is needed to send data obtained from another component (e.g., a sensor device 360, the MPMS controller 304) in the subsystem 499. In addition, the control engine 506 of the controller 404 may control the operation of one or more other components (e.g., a sensor device 360, the MPMS controller 304), or portions thereof, of the subsystem 499.

The control engine 506 of the controller 404 may communicate with one or more other components of the subsystem 499. For example, the control engine 506 may use one or more protocols 532 to facilitate communication with the sensor devices 360 to obtain data (e.g., measurements of various parameters, such as temperature, pressure, and flow rate), whether in real time or on a periodic basis and/or to instruct a sensor device 360 to take a measurement. The control engine 506 may use measurements of parameters taken by sensor devices 360 to perform one or more steps in maintaining the MPMS 485 using one or more protocols 532 and/or one or more algorithms 533. As yet another example, the control engine 506 may use one or more algorithms 533 and/or protocols 532 to affirmatively identify one or more pressure values as a blockage within the MPMS.

The control engine 506 may generate and process data associated with control, communication, and/or other signals sent to and obtained from the users 451 (including associated user systems 455), the sensor devices 460, the sensor devices 360, the network manager 427, the MPMS controller 304, and/or any other components of the subsystem 499. In certain embodiments, the control engine 506 of the controller 404 may communicate with one or more components of a system external to the subsystem 499. For example, the control engine 506 may interact with an inventory management system by ordering replacements for components or pieces of equipment (e.g., a sensor device 360, a valve, a motor) within the subsystem 499 that has failed or is failing. As another example, the control engine 506 may interact with a contractor or workforce scheduling system by arranging for the labor needed to replace a component or piece of equipment in the subsystem 499. In this way and in other ways, the controller 404 is capable of performing a number of functions beyond what could reasonably be considered a routine task.

In certain example embodiments, the control engine 506 may include an interface that enables the control engine 506 to communicate with the sensor devices 460, the sensor devices 360, the user systems 455, the network manager 427, the MPMS controller 304, and/or any other components of the subsystem 499. For example, if a user system 455 operates under IEC Standard 62386, then the user system 455 may have a serial communication interface that will transfer data to the controller 404. Such an interface may operate in conjunction with, or independently of, the protocols 532 used to communicate between the controller 404 and the users 451 (including corresponding user systems 455), the sensor devices 460, the sensor devices 360, the network manager 427, the MPMS controller 304, and any other components of the subsystem 499.

The control engine 506 (or other components of the controller 404) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The detection module 536 of the maintenance system controller 404 may be configured to detect and/or identify an issue with the MPMS 485. The detection module 536 may use values received by the control engine 506, where the values are associated with measurements of a parameter (e.g., a flow rate, a pressure, a temperature) measured by one or more of the sensor devices 460 of the MPMS 485. These values may also be associated with the operation of the MPMS 485. The values received by the detection module 536 from the control engine 506 may be the actual measurements made by the one or more sensor devices 460. In addition, or in the alternative, the values received by the detection module 536 may be calculated, filtered, and/or otherwise manipulated by the control engine 506 using one or more protocols 532 and/or one or more algorithms 533. For example, if the detection module 536 is configured to use values for a parameter that have a particular unit of measure, the control engine 506 can ensure that a measurement received by the control engine 506 from a sensor device 460 has the proper unit of measure required by the detection module 536.

In order to detect and/or identify an issue with the MPMS 485 using the values received from the control engine 506, the detection module 536 can use one or more protocols 532, one or more algorithms 533, and/or stored data 534. For example, the values can be input into an algorithm 533 in the form of a model, the output of which can be compared with values in a table (part of the stored data 534) that represent a range of acceptable values. If the output of the model falls outside the range of acceptable values in the table, then the detection module 536 may determine that the values indicate that there is an issue with the MPMS 485.

An issue detected by the detection module 536 may be broad. For example, the detection module 536 may only determine that there is some blockage within the MPMS 485. Alternatively, an issue detected by the detection module 536 can be more specific. For example, the detection module 536 may determine the particular component or part of the MPMS 485 that is experiencing blockage, how severe the blockage is, and/or how quickly the blockage is increasing over time. The detection module 536 can also compare the values received from the control engine 506 with historical values to help the detection module 536 determine the issue, including particulars thereof, with the MPMS 485. In the event that a discrepancy arises between actual results and expected results, the control engine 506 can adjust one or more of the algorithms 533, one or more of the protocols 532, and/or some of the stored data 534 used by the detection module 536 as part of a self-correcting or self-learning function.

The categorization module 537 of the maintenance system controller 404 may be configured to determine the method to be used to attempt to resolve the issue with the MPMS 485 by categorizing the issue based, at least in part, on the output of the detection module 536. The categorization module 537 can use one or more protocols 532, one or more algorithms 533, and/or stored data 534 to categorize the issue. For example, if the issue detected by the detection module 536 is a sudden blockage at the distal end of the Venturi chamber of the MPMS 485, the categorization module 537 can determine, based on the applicable protocols 532, algorithms 533, and/or stored data 534, that the issue requires urgent and aggressive treatment.

In addition to categorizing the urgency or priority of a current issue with the MPMS 485, the categorization module 537 may assess how the issue should be treated. For example, the categorization module 537 may determine which fluids 748 are available in the fluid management apparatus 445, the quantity of those fluids 748, the capabilities of the fluid injection system 747 associated with each fluid 748, and/or other information that would allow the categorization module 537 to identify potential treatments to address the issue. With this information, the categorization module 537 may use one or more protocols 532, one or more algorithms 533, and/or stored data 534 to identify the best treatment option to attempt to resolve the issue. In the event that a discrepancy arises between actual results and expected results, the control engine 506 can adjust one or more of the algorithms 533, one or more of the protocols 532, and/or some of the stored data 534 used by the categorization module 537 as part of a self-correcting or self-learning function.

In some cases, the method or process to resolve the issue with the MPMS 485 can be based, at least in part, on prior attempts to resolve the same issue. For example, if a third attempt is being made to resolve the issue, and the exact same method (e.g., in terms of the one or more fluids 748 used, in terms of a pressure or flow rate of the one or more fluids 748, in terms of the temperature of the one or more fluids 748, in terms of the duration of the prior attempt) was used the first two times, then the categorization module 537 may alter one or more factors in the third attempt so that the third attempt to resolve the issue may be successful.

The implementation module 538 of the maintenance system controller 404 may be configured to implement the treatment option identified by the categorization module 537. In this way, the implementation module 538 can directly control the appropriate components (or portions thereof) of one or more of the fluid injection systems 747 of the fluid management apparatus 445. If the fluid management apparatus 445 includes an optional controller 704, then the implementation module 538 can direct the controller 704 to control the one or more of the fluid injection systems 747 of the fluid management apparatus 445. The implementation module 538 can use one or more protocols 532, one or more algorithms 533, and/or stored data 534 in performing its function of implementing the treatment option in an attempt to resolve the issue with the MPMS 485.

In some cases, the implementation module 538 may be configured to obtain (or cause to be obtained) additional quantities of a fluid 748 when the corresponding fluid source 746 is running low. In addition, or in the alternative, in some cases, the implementation module 538 may be configured to remove (or cause to have removed) some or all of the return fluid 757 within a corresponding collection vessel 741. In the event that a discrepancy arises between actual results and expected results, the control engine 506 can adjust one or more of the algorithms 533, one or more of the protocols 532, and/or some of the stored data 534 used by the implementation module 538 as part of a self-correcting or self-learning function.

The evaluation module 552 of the maintenance system controller 404 may be configured to evaluate the effectiveness of the treatment that was implemented by the implementation module 538. The evaluation module 552 may use values received by the control engine 506, where the values are associated with measurements of a parameter (e.g., a flow rate, a pressure, a temperature) measured by one or more of the sensor devices 460 of the MPMS 485. These values may also be associated with the operation of the MPMS 485. The values received by the evaluation module 552 from the control engine 506 may be the actual measurements made by the one or more sensor devices 460. In addition, or in the alternative, the values received by the evaluation module 552 may be calculated, filtered, and/or otherwise manipulated by the control engine 506 using one or more protocols 532 and/or one or more algorithms 533. For example, if the evaluation module 552 is configured to use values for a parameter that have a particular unit of measure, the control engine 506 can ensure that a measurement received by the control engine 506 from a sensor device 460 has the proper unit of measure required by the evaluation module 552.

In order to evaluate a treatment implemented by the implementation module 538 using the values received from the control engine 506, the evaluation module 552 can use one or more protocols 532, one or more algorithms 533, and/or stored data 534. For example, the values associated with measurements taken after the treatment can be compared with expected values in a table (part of the stored data 534) that list a range of acceptable values when a blockage has been cleared and/or some other problem with the MPMS 485 has been resolved. If the values (or an output of a model that uses the values as inputs) fall outside the range of acceptable values in the table, then the evaluation module 552 may determine that the values indicate that there is an issue with the MPMS 485. In the event that a discrepancy arises between actual results and expected results, the control engine 506 can adjust one or more of the algorithms 533, one or more of the protocols 532, and/or some of the stored data 534 used by the evaluation module 552 as part of a self-correcting or self-learning function.

The communication module 507 of the controller 404 determines and implements the communication protocol (e.g., from the protocols 532 of the storage repository 531) that is used when the control engine 506 communicates with (e.g., sends signals to, obtains signals from) the user systems 455, the sensor devices 460, the sensor devices 360, the network manager 427, the MPMS controller 304, and any other components of the subsystem 499. In some cases, the communication module 507 accesses the stored data 534 to determine which communication protocol is used to communicate with another component of the testing subsystem 499. In addition, the communication module 507 may identify and/or interpret the communication protocol of a communication obtained by the controller 404 so that the control engine 506 may interpret the communication. The communication module 507 may also provide one or more of a number of other services with respect to data sent from and obtained by the controller 404. Such services may include, but are not limited to, data packet routing information and procedures to follow in the event of data interruption.

The timer 535 of the controller 404 may track clock time, intervals of time, an amount of time, and/or any other measure of time. The timer 535 may also count the number of occurrences of an event, whether with or without respect to time. Alternatively, the control engine 506 may perform a counting function. The timer 535 is able to track multiple time measurements and/or count multiple occurrences concurrently. The timer 535 may track time periods based on an instruction obtained from the control engine 506, based on an instruction obtained from a user 451, based on an instruction programmed in the software for the controller 404, based on some other condition (e.g., the occurrence of an event) or from some other component, or from any combination thereof. In certain example embodiments, the timer 535 may provide a time stamp for each packet of data obtained from another component (e.g., a sensor device 360) of the subsystem 499.

The power module 530 of the controller 404 obtains power from a power supply (e.g., AC mains) and manipulates (e.g., transforms, rectifies, inverts) that power to provide the manipulated power to one or more other components (e.g., the timer 535, the control engine 506) of the controller 404, where the manipulated power is of a type (e.g., alternating current, direct current) and level (e.g., 12V, 24V, 120V) that may be used by the other components of the controller 404. In some cases, the power module 530 may also provide power to one or more components (e.g., a local controller 704 of the fluid management apparatus 445, a sensor device 760 of the fluid management apparatus 445, an actuator for a valve 894 of the maintenance system manifold 470) of the example maintenance system 480.

The power module 530 may include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 may be a source of power in itself to provide signals to the other components of the controller 404. For example, the power module 530 may be or include an energy storage device (e.g., a battery). As another example, the power module 530 may be or include a localized photovoltaic power system.

The hardware processor 521 of the controller 404 executes software, algorithms (e.g., algorithms 533), and firmware in accordance with one or more example embodiments. Specifically, the hardware processor 521 may execute software on the control engine 506 or any other portion of the controller 404, as well as software used by the users 451 (including associated user systems 455), the network manager 427, the MPMS controller 304, and/or other components of the subsystem 499. The hardware processor 521 may be an integrated circuit, a central processing unit, a multi-core processing chip, SoC, a multi-chip module including multiple multi-core processing chips, or other hardware processor in one or more example embodiments. The hardware processor 521 may be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 may include volatile and/or non-volatile memory. The memory 522 may be discretely located within the controller 404 relative to the hardware processor 521. In certain configurations, the memory 522 may be integrated with the hardware processor 521.

In certain example embodiments, the controller 404 does not include a hardware processor 521. In such a case, the controller 404 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices may be used in conjunction with one or more hardware processors 521.

The transceiver 524 of the controller 404 may send and/or obtain control and/or communication signals. Specifically, the transceiver 524 may be used to transfer data between the controller 404 and the users 451 (including associated user systems 455), the sensor devices 460, the sensor devices 360, the network manager 427, the MPMS controller 304, and any other components of the subsystem 499. The transceiver 524 may use wired and/or wireless technology. The transceiver 524 may be configured in such a way that the control and/or communication signals sent and/or obtained by the transceiver 524 may be obtained and/or sent by another transceiver that is part of a user system 455, a sensor device 460, a sensor device 360, the network manager 427, the MPMS controller 304, and/or another component of the subsystem 499. The transceiver 524 may send and/or obtain any of a number of signal types, including but not limited to radio frequency signals.

When the transceiver 524 uses wireless technology, any type of wireless technology may be used by the transceiver 524 in sending and obtaining signals. Such wireless technology may include, but is not limited to, Wi-Fi, Zigbee, VLC, cellular networking, BLE, UWB, and Bluetooth. The transceiver 524 may use one or more of any number of suitable communication protocols (e.g., ISA100, HART) when sending and/or obtaining signals.

Optionally, in one or more example embodiments, the security module 523 secures interactions between the controller 404, the users 451 (including associated user systems 455), the sensor devices 460, the sensor devices 360, the network manager 427, the MPMS controller 304, and any other components of the subsystem 499. More specifically, the security module 523 authenticates communication from software based on security keys verifying the identity of the source of the communication. For example, user software may be associated with a security key enabling the software of a user system 455 to interact with the controller 404. Further, the security module 523 may restrict receipt of information, requests for information, and/or access to information.

The fluid management apparatus 445 of the example maintenance system 480 is configured to manage the one or more fluids 748 used to maintain (e.g., clean) the MPMS 485. The fluid management apparatus 445 is configured to manage the one or more return fluids 757 that are returned after maintaining the MPMS 485. The fluid management apparatus 445 can include one or more of a number of components. For example, in this case, the fluid management apparatus 445 includes one or more fluid sources 746, one or more fluid injection systems 747, an optional mixing apparatus 749, one or more valves 794, one or more outlet ports 744, one or more inlet ports 743, one or more return fluid conveyance systems 742, one or more collection vessels 741, one or more vent ports 739, piping 688 used for venting, piping 788 between the various components of the fluid management apparatus 445, one or more sensor devices 760, an optional local controller 704, and an optional housing 745. The piping 688 and the piping 788 can be substantially the same as the piping (e.g., piping 288, piping 388) discussed above.

During operation of the maintenance system 480, one or more fluids 748 are used to maintain (e.g., clean) some or all of the MPMS 485. Specifically, the one or more fluids 748 is delivered to an outlet port 744 so that the fluid 748 can be routed through the maintenance system manifold 470 to the MPMS 485. In some cases, multiple fluids 748 are mixed together in the optional fluid mixing apparatus 749, and the resulting mixture (a new fluid 748) is delivered to an outlet port 744. Each fluid 748 is transported from one or more fluid sources 746 through piping 788 using one or more of the fluid injection systems 747. A fluid 748 can be in a gaseous state, a liquid state, a partially solid state, or any combination thereof. Examples of a fluid 748 can include, but are not limited to, water, ambient air, a gas (e.g., inert gas, nitrogen, gaseous hydrocarbon), a liquid that breaks down grease and/or solids (e.g., acid breaks down scale, xylene breaks down paraffin, chelating agents breaking down scale, methanol breaks down hydrate), a liquid hydrocarbon, other chemicals (e.g., scale inhibitor, demulsifier, corrosion inhibitor, paraffin solvent), and a gel that breaks down grease and/or solids.

Each fluid source 746 of the fluid management apparatus 445 may hold one or more fluids 748. Examples of a fluid source 746 may include, but are not limited to, a tank, a vessel, a sealed container, and the ambient environment. Each fluid injection system 747 is configured to deliver one or more of the fluids 748 from one or more of the fluid sources 746 through some of the piping 788 to one or more of the outlet ports 744 and/or to the optional fluid mixing apparatus 749. A fluid injection system 747 can include one or more of a number of components, including but not limited to a motor, a pump, a compressor, piping 788, a valve 794, a controller (e.g., one of the local controllers 704), a sensor device 760, a heater, a cooling device, a protective relay, and an electrical cable.

A fluid injection system 747 may have one or more of any of a number of actuation methods. For example, a fluid injection system 747 may include one or more electrical actuation methods (e.g., a solenoid, a contactor, a relay) to begin, continue, and/or end the performance of its functions. As another example, a fluid injection system 747 may include one or more mechanical actuation methods (e.g., a valve 494, a gate) to begin, continue, and/or end the performance of its functions. Other examples of types of actuation methods of a fluid injection system 747 may include, but are not limited to, hydraulic, pneumatic, chemical, physical, and human intervention. In some cases, a fluid injection system 747 includes a combination of multiple actuation methods.

A fluid injection system 747 may be controlled, in full or in part, by the maintenance system controller 404 of the management system 480. When the fluid management system 445 includes multiple fluid injection systems 747, the characteristics (e.g., actuation methods, maximum flow capacity, temperature control capability) of one fluid injection system 747 may be the same as or different than the corresponding characteristics of one or more of the other fluid injection systems 747.

As discussed above, there can be any number of fluid sources 746, any number of fluids 748, any number of fluid injection systems 747, and any number of outlet ports 744 of the fluid management apparatus 445. For example, in this case, there are X fluid sources 746 (fluid source 746-1 through fluid source 746-X), X fluids 748 (fluid 748-1 through fluid 748-X), X fluid injection systems 747 (fluid injection system 747-1 through fluid injection system 747-X), and X outlet ports 744 (outlet port 744-1 through outlet port 744-X). The number of fluid sources 746 can be the same as, or different than, the number of fluids 748, the number of fluid injection systems 747, and/or the number of outlet ports 744. Similarly, the number of fluids 748 can be the same as, or different than, the number of fluid injection systems 747 and/or the number of outlet ports 744. Further, the number of fluid injection systems 747 can be the same as, or different than, the number of outlet ports 744.

During operation of the maintenance system 480, one or more return fluids 757 are received after a maintenance operation (e.g., an attempted cleaning) of the MPMS 485. Specifically, the one or more return fluids 757 is received at an inlet port 743 after being routed through the maintenance system manifold 470 from the MPMS 485. Each return fluid 757 is transported to one or more collection vessels 741 through piping 788 using one or more of the return fluid conveyance systems 742. A return fluid 757 can be a fluid 748 that is mixed with dirt, debris, oil, and/or any other fluid or material that was causing blockage within the MPMS 485. A return fluid 757 can be in a gaseous state, a liquid state, a partially solid state, or any combination thereof.

Each collection vessel 741 of the fluid management apparatus 445 may hold one or more return fluids 757. Examples of a collection vessel 741 may include, but are not limited to, a tank, a sealed container, a vessel, and the ambient environment. Each return fluid conveyance system 742 is configured to deliver one or more of the return fluids 757 to one or more of the collection vessels 741 through some of the piping 788 from one or more of the inlet ports 743. A return fluid conveyance system 742 can include one or more of a number of components, including but not limited to a motor, a pump, a compressor, piping 788, a valve 794, a controller (e.g., one of the local controllers 704), a sensor device 760, a heater, a cooling device, a protective relay, and an electrical cable. While not shown in FIG. 7, piping 788 can allow for the flow of one or more return fluids 757 from one collection vessel 741 to one or more of the other collection vessels 741 of the fluid management apparatus 445.

In some cases, one or more sensor devices 760 measuring a parameter associated with the collection vessel 741 may indicate that a collection vessel 741 is becoming full. Examples of such a parameter may include, but are not limited to, a weight of the collection vessel 741, a level of a return fluid 757 within the collection vessel 741, and an amount of time since the collection vessel 741 was last vacated of return fluid 757. When too much return fluid 757 accumulates in a collection vessel 741, some or all of the return fluid 757 can be removed from the collection vessel 741 manually (e.g., by a user 451 after a user system 455 receives a notification from the local controller 704) or automatically (e.g., using a return fluid conveyance system 742, controlled by the local controller 704, to expel excess return fluid 757 through piping 788, a vent port 739, and out piping 688. In addition, or in the alternative, when too much return fluid 757 accumulates in one of the collection vessels 741, some or all of the return fluid 757 can be redirected or diverted (e.g., manually, automatically) to one or more of the other collection vessels 741.

As discussed above, there can be any number of collection vessels 741, any number of return fluids 757, any number of return fluid conveyance systems 742, any number of vent ports 739, and any number of inlet ports 743 of the fluid management apparatus 445. For example, in this case, there are Y collection vessels 741 (collection vessel 741-1 through collection vessel 741-Y), Y return fluids 757 (return fluid 757-1 through return fluid 757-Y), Y return fluid conveyance systems 742 (return fluid conveyance system 742-1 through return fluid conveyance system 742-Y), Y vent ports 739 (vent port 739-1 through vent port 739-Y), and Y inlet ports 743 (inlet port 743-1 through inlet port 743-Y). The number of collection vessels 741 can be the same as, or different than, the number of return fluids 757, number of return fluid conveyance systems 742, the number of vent ports 739, and/or the number of inlet ports 743. Similarly, the number of return fluids 757 can be the same as, or different than, the number of return fluid conveyance systems 742, the number of vent ports 739, and/or the number of inlet ports 743. Further, the number of return fluid conveyance systems 742 can be the same as, or different than, the number of vent ports 739 and/or the number of inlet ports 743. Further, the number of vent ports 739 can be the same as, or different than, the number of inlet ports 743.

Each outlet port 744, inlet port 743, and/or vent port 739 can include one or more coupling features (e.g., mating threads) that are configured to complement a coupling feature of another component of the subsystem 499. For example, an outlet port 744 of the fluid management apparatus 445 may include a coupling feature that is configured to complement a coupling feature on an inlet port 871 of the maintenance system manifold 470. As another example, an inlet port 743 of the fluid management apparatus 445 may include a coupling feature that is configured to complement a coupling feature on an outlet port 872 of the maintenance system manifold 470. As yet another example, a vent port 739 of the fluid management apparatus 445 may include a coupling feature that is configured to complement a coupling feature on the piping 688 in the form of a vent pipe.

Each of the sensor devices 760 of the fluid management apparatus 445 may include one or more sensors that measure one or more parameters (e.g., pressure, flow rate, temperature, humidity, fluid content, voltage, current). Examples of a sensor of a sensor device 760 may include, but are not limited to, a temperature sensor, a flow sensor, a pressure sensor, a gas spectrometer, a voltmeter, an ammeter, a level sensor, a gas chromatographer, a microscope, and a camera. A sensor device 760 may be integrated with or measure a parameter associated with one or more fluids 748 and/or one or more of the return fluids 757 of the fluid management apparatus 445. For example, a sensor device 760 may be integrated with a fluid injection system 747 and/or a return fluid conveyance system 742 and may be configured to measure a parameter associated with a fluid 748 and/or a return fluid 757 in the form of a pressure, a differential pressure, a flow rate, a level, a volume, a temperature, a composition, and/or some other parameter.

As another example, a sensor device 760 may be configured to determine how open or closed a valve (e.g., valve 794) within the fluid management apparatus 445 is. In some cases, a number of sensor devices 760, each measuring a different parameter, may be used in combination to determine and confirm whether a component (e.g., the local controller 704, a return fluid conveyance system 742) should take a particular action. When a sensor device 760 includes its own controller (e.g., similar to the maintenance system controller 404 or portions thereof, similar to the MPMS controller 304 or portions thereof), then the sensor device 760 may be considered a type of computer device, as discussed below with respect to FIG. 6.

The local controller 704 of the fluid management apparatus 445, when present, may be a device or component that controls all or a portion of the fluid management apparatus 445. The local controller 704 may be substantially similar to a controller (e.g., the MPMS controller 304, the maintenance system controller 404), or portions thereof, as described above. For example, the local controller 704 may include a controller that has one or more components and/or similar functionality to some or all of the maintenance system controller 404. Alternatively, the local controller 704 may include one or more of a number of features in addition to, or altered from, the features of a controller (e.g., the MPMS controller 304, the maintenance system controller 404). As described herein, control and/or communication with the local controller 704 may include communicating with one or more other components of the maintenance system 480 and/or another part of the subsystem 499. In such a case, the local controller 704 may facilitate such control and/or communication. The local controller 704 may be considered a type of computer device, as discussed below with respect to FIG. 6.

There may be a number of valves 794 placed in-line with the piping 788 at various locations in the fluid management apparatus 445 to control the flow of any of the various fluids 748 and/or the return fluids 757 that flow through the piping 788. A valve 794 may have one or more of any of a number of configurations, including but not limited to a guillotine valve, a ball valve, a gate valve, a butterfly valve, a pinch valve, a needle valve, a plug valve, a diaphragm valve, and a globe valve. One valve 794 may be configured the same as or differently compared to another valve 794 in the fluid management apparatus 445. Also, one valve 794 may be controlled (e.g., manually, automatically by the local controller 704, by the maintenance system controller 404) the same as or differently compared to another valve 794 in the fluid management apparatus 445.

In some cases, one or more components of the fluid management apparatus 445 may be disposed within an optional housing 745. In such cases, the housing 745 can be used to house one or more components of the fluid management apparatus 445, including one or more components of the local controller 704. Such components may be disposed in the cavity formed by the housing 745. In alternative embodiments, any one or more of these or other components of the fluid management apparatus 445 can be disposed on the housing 745, integrated with the housing 745, and/or disposed remotely from the housing 745.

The maintenance system manifold 470 of the example maintenance system 480 is configured to facilitate the flow of fluids 748 and return fluids 757 between the fluid management apparatus 445 and the MPMS 485. More specifically, the maintenance system manifold 470 may be configured to facilitate the flow of the fluids 748 from the fluid sources 746, via the fluid injection systems 747, of the fluid management apparatus 445 to the MPMS 485 so that the fluids 748 can be used in an attempt to maintain (e.g., clean, remove blockages within) the MPMS 485. The maintenance system manifold 470 may additionally or alternatively be configured to facilitate the flow of the return fluids 757 from the MPMS 485 to the collection vessels 741, via the return fluid conveyance systems 742, of the fluid management apparatus 445.

The maintenance system manifold 470 may include any of a number of components. For example, as shown in FIG. 8, the maintenance system manifold 470 can include piping 888, one or more inlet ports 871, one or more outlet ports 872, a MPMS interface 479 that includes one or more MPMS ports 874, one or more valves 894, and an optional housing 873. The valves 894 can be substantially similar to the valves 794 discussed above, and the piping 888 can be substantially similar to the piping discussed above.

There can be any number of inlet ports 871, any number of outlet ports 872, and any number of MPMS ports 874 of the maintenance system manifold 470. For example, in this case, there are X inlet ports 871 (inlet port 871-1 through inlet port 871-X), Y outlet ports 872 (outlet port 872-1 through outlet port 872-Y), and N MPMS ports 874 (MPMS port 874-1 through MPMS port 874-N). The number of inlet ports 871 can be the same as, or different than, the number of outlet ports 872 and/or the number of MPMS ports 874. Similarly, the number of outlet ports 872 can be the same as, or different than, the number of MPMS ports 874.

Each outlet port 872, inlet port 871, and/or MPMS port 874 can include one or more coupling features (e.g., mating threads) that are configured to complement a coupling feature of another component of the subsystem 499. For example, an outlet port 872 of the maintenance system manifold 470 may include a coupling feature that is configured to complement a coupling feature on an inlet port 743 of the fluid management apparatus 445. As another example, an inlet port 871 of the maintenance system manifold 470 may include a coupling feature that is configured to complement a coupling feature on an outlet port 744 of the fluid management apparatus 445. As yet another example, a MPMS port 874 of the maintenance system manifold 470 may include a coupling feature that is configured to complement a coupling feature on the external interface 492 of the MPMS 485. Further, more generally, all of the MPMS ports 874 that make up the MPMS interface 479 are arranged in such a way that complements the arrangement of external interface 492 of the MPMS 485.

In certain example embodiments, the MPMS interface 479 of the maintenance system manifold 470 includes one or more coupling features (e.g., apertures, latches, latch receivers, mating threads, tabs, slots) that allow the maintenance system manifold 470 to be directly or indirectly coupled to the external interface 492 of the MPMS 485. Such coupling features may be configured to complement (e.g., in terms of number, in terms of location, in terms of configuration) the coupling features of the external interface 492 of the MPMS 485. In some cases, the coupling features of the MPMS interface 479 may be configured to be decoupled from the complementary coupling features of the external interface 492 of the MPMS 485. In some cases, the MPMS interface 479 includes one or more features (e.g., a channel with a gasket, a machined mating surface) that creates a seal with the external interface 492 of the MPMS 485 when the MPMS interface 479 is coupled to the external interface 492.

In some cases, one or more components of the maintenance system manifold 470 may be disposed within an optional housing 873. In such cases, the housing 873 can be used to house one or more components of the maintenance system manifold 470, including one or more valves 894 and/or some or all of the piping 888. Such components may be disposed in the cavity formed by the housing 873. In alternative embodiments, any one or more of these or other components of the maintenance system manifold 470 can be disposed on the housing 873, integrated with the housing 873, and/or disposed remotely from the housing 873.

While not shown in FIG. 8, the maintenance system manifold 470 may include one or more sensor devices, which can be substantially similar to the sensor devices 760 discussed above. For example, a sensor device may be integrated with the piping 888 of the maintenance system manifold 470 to measure a parameter (e.g., a pressure, a differential pressure, a flow rate, a temperature) associated with a fluid 748 and/or a return fluid 757 flowing therethrough. As another example, a sensor device may be configured to determine how open or closed a valve 894 within the maintenance system manifold 470 is.

As discussed above, the MPMS 485 is currently known in the art. The MPMS 485 is configured to measure single-phase or multiple-phase (e.g., homogenous, non-homogenous) flow (e.g., oil, wet gas, dry gas, solids, solids entrained in one or more of the fluids, condensate, water). The MPMS 485 may include any of a number of components. For example, in this case, the MPMS 485 includes one or more sensor devices 360, a MPMS controller 304, a MPMS actuator 495, an external interface 492, and a housing 491. The MPMS 485 can include one or more of a number of additional components, including but not limited to a valve (e.g., similar to the valves discussed above), a Venturi chamber). Various views of an example MPMS are shown below with respect to FIGS. 11A and 11B.

The sensor devices 360 of the MPMS 485 can be substantially the same as the sensor devices 760 discussed above. For example, each of the sensor devices 360 of the MPMS 485 may include one or more sensors that measure one or more parameters (e.g., pressure, flow rate, temperature, humidity, fluid content, voltage, current). Examples of a sensor of a sensor device 360 may include, but are not limited to, a temperature sensor, a flow sensor, a pressure sensor, a gas spectrometer, a gas chromatographer, a level sensor, a voltmeter, an ammeter, a microscope, and a camera.

A sensor device 360 may measure a parameter associated with one or more fluids and/or one or more solids flowing through the piping 488 coupled to the MPMS 485. A parameter measured by a sensor device 360 can be provided to and used by the MPMS controller 304 of the MPMS 485. In some cases, a sensor device 360 can be controlled by the MPMS controller 304. When a sensor device 360 includes its own controller (e.g., similar to the maintenance system controller 404 or portions thereof, similar to the MPMS controller 304 or portions thereof), then the sensor device 360 may be considered a type of computer device, as discussed below with respect to FIG. 6. In some cases, a sensor device 360 can or be part of a meter.

The MPMS controller 304 of the MPMS 485 may be a device or component that controls all or a portion of the MPMS 485. The MPMS controller 304 may be substantially similar to a controller (e.g., the maintenance system controller 404), or portions thereof, as described above. For example, the MPMS controller 304 may include a controller that has one or more components and/or similar functionality to some or all of the maintenance system controller 404. Alternatively, the MPMS controller 304 may include one or more of a number of features in addition to, or altered from, the features of a controller (e.g., the maintenance system controller 404).

As described herein, control and/or communication with the MPMS controller 304 may include communicating with one or more other components of the subsystem 499. In such a case, the MPMS controller 304 may facilitate such control and/or communication. For example, the MPMS controller 304 and the maintenance system controller 404 of the maintenance system 480 can be configured to communicate with each other. In such cases, the maintenance system controller 404 can notify the MPMS controller 304 when a maintenance operation (e.g., using a fluid 748 to clean the MPMS 485) is about to begin, end, etc., so that the MPMS controller 304 can control part (e.g., the MPMS actuator 495) of the MPMS 485 to operate accordingly. The MPMS controller 304 may be considered a type of computer device, as discussed below with respect to FIG. 6.

The MPMS actuator 495 of the MPMS 485 is configured to change or alter the operation of the MPMS 485 or portions thereof. For example, the MPMS actuator 495 can be configured to change the temperature of a heating sleeve within the MPMS 485. As another example, the MPMS actuator 495 can be configured to adjust and/or change the state of one or more valves within the MPMS 485. The MPMS 485 can be controlled by the MPMS controller 304.

The housing 491 of the MPMS 485 may be used to house one or more components of the MPMS 485, including one or more of the sensor devices 460, one or more components of the MPMS controller 304, and/or the MPMS actuator 495. Such components may be disposed in the cavity formed by the housing 491. In alternative embodiments, any one or more of these or other components of the MPMS 485 can be disposed on the housing 491, integrated with the housing 491, and/or disposed remotely from the housing 491. In some cases, the housing 491 can be rated for hazardous environments. The housing 491 can include one or more features (e.g., flanges) that allow the housing 491 to be coupled to the piping 488.

The housing 491 can also include the external interface 492, which allows the housing 491 of the MPMS 485 to be coupled to the example maintenance system 480. Specifically, the external interface 492 includes one or more coupling features (e.g., apertures, latches, latch receivers, mating threads, tabs, slots) that allow the external interface 492 of the MPMS 485 to be directly or indirectly coupled to the MPMS interface 479 of the maintenance system manifold 470 of the maintenance system 480. Such coupling features may be configured to complement (e.g., in terms of number, in terms of location, in terms of configuration) the coupling features of the MPMS interface 479 of the maintenance system manifold 470 of the maintenance system 480. In some cases, the coupling features of the external interface 492 of the MPMS 485 may be configured to be decoupled from the complementary coupling features of the maintenance system manifold 470 of the maintenance system 480. In some cases, the external interface 492 of the MPMS 485 includes one or more features (e.g., a channel with a gasket, a machined mating surface) that creates a seal with the MPMS interface 479 of the maintenance system manifold 470 of the maintenance system 480 when the MPMS interface 479 of the maintenance system 480 and the external interface 492 are coupled to each other. In some cases, the external interface 492 requires no modification (e.g., drilling of holes, adding other types of coupling features) in order to couple to the MPMS interface 479 of the maintenance system manifold 470 of the maintenance system 480.

In certain example embodiments, the example maintenance system 480 is coupled to the MPMS 485 while the maintenance system 480 operates to resolve an issue (e.g., clear a blockage, conduct a routine cleaning) within the MPMS 485. Further, in some cases, the maintenance system 480 can be implemented to resolve an issue within the MPMS 485 while the MPMS 485 remains coupled to the piping 488. Still further, in some cases, the maintenance system 480 can be implemented to resolve an issue within the MPMS 485 without interrupting the operations of the MPMS 485 and/or the flow of fluid through the piping 488.

A user 451 (including an associated user system 455), the sensor devices 460, the sensor devices 360, the network manager 427, the MPMS controller 304, and the other components of the subsystem 499 may interact with the controller 404 using the application interface 526. Specifically, the application interface 526 of the controller 404 obtains data (e.g., information, communications, instructions, updates to firmware) from and sends data (e.g., information, communications, instructions) to the user systems 455 of the users 451, the sensor devices 460, the sensor devices 360, the network manager 427, the MPMS controller 304, and/or the other components of the testing subsystem 499. Examples of an application interface 526 may be or include, but are not limited to, an application programming interface, a web service, a data protocol adapter, some other hardware and/or software, or any suitable combination thereof. Similarly, the user systems 455 of the users 451, the sensor devices 460, the sensor devices 360, the MPMS controller 304, the network manager 427, and/or the other components of the subsystem 499 may include an interface (similar to the application interface 526 of the controller 404) to obtain data from and send data to the controller 404 in certain example embodiments.

In addition, as discussed above with respect to a user system 455 of a user 451, one or more of the sensor devices 460, the sensor devices 360, the network manager 427, the MPMS controller 304, and/or one or more of the other components of the subsystem 499 may include a user interface. Examples of such a user interface may include, but are not limited to, a graphical user interface, a touchscreen, a keyboard, a monitor, a mouse, some other hardware, or any suitable combination thereof.

The controller 404, the users 451 (including associated user systems 455), the sensor devices 460, the sensor devices 360, the network manager 427, the MPMS controller 304, and the other components of the subsystem 499 may use their own system or share a system in certain example embodiments. Such a system may be, or contain a form of, an Internet-based or an intranet-based computer system that is capable of communicating with various software. A computer system includes any type of computing device and/or communication device, including but not limited to the controller 404. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 6.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the subsystem 499.

As discussed above, the MPMS 485 of the subsystem 499 may include a MPMS controller 304. The MPMS controller 304 of the MPMS 485 communicates with and in some cases controls one or more of the other components (e.g., the sensor devices 460, the MPMS actuator 495) of the MPMS 485. The MPMS controller 304 may perform functions that include, but are not limited to, obtaining and sending data, evaluating data, following protocols, running algorithms, and sending commands. The MPMS controller 304 may include one or more of a number of components. Such components of the MPMS controller 304 may include, but are not limited to, a control engine, a communication module, a timer, a counter, a power module, a storage repository, a hardware processor, memory, a transceiver, an application interface, and a security module, all of which can be substantially the same as the corresponding components of the maintenance system controller 404 of the maintenance system 480 discussed above. When there are multiple MPMS controllers 304 and/or multiple maintenance system controllers 404, each MPMS controller 304 and each maintenance system controller 404 may operate independently of each other. Alternatively, the MPMS controller 304 and/or the maintenance system controller 404 may work cooperatively with each other. As yet another alternative, one of the controllers (e.g., the maintenance system controller 404) may control some or all of one or more other controllers (e.g., the MPMS controller 304) in the subsystem 499. The MPMS controller 304 and the maintenance system controller 404 may be considered a type of computer device, as discussed below with respect to FIG. 6.

Each sensor device 460 and each sensor device 360 can be substantially similar to the sensor devices 760 discussed above. For example, each sensor device 460 and each sensor device 360 may include one or more sensors that measure one or more parameters (e.g., pressure, flow rate, temperature, humidity, fluid content, voltage, current, permeability, porosity, rock characteristics). Examples of a sensor of a sensor device 460 and/or a sensor device 360 may include, but are not limited to, a temperature sensor, a flow sensor, a pressure sensor, a gas spectrometer, a voltmeter, an ammeter, a permeability meter, a porosimeter, a gas chromatographer, a level sensor, a microscope, and a camera. A sensor device 460 and/or a sensor device 360 may be integrated with or measure a parameter associated with one or more components of the subsystem 499. For example, a sensor device 360 may be integrated with the MPMS 485 and may be configured to measure a parameter in the form of a pressure, a differential pressure, a flow rate, a level, a volume, a temperature, and/or some other parameter associated with the MPMS 485.

As another example, a sensor device 460 and/or a sensor device 360 may be configured to determine how open or closed a valve (e.g., valve 794) within the subsystem 499 is. In some cases, a number of sensor devices 460 and/or sensor devices 360, each measuring a different parameter, may be used in combination to determine and confirm whether the MPMS controller 304 and/or the maintenance system controller 404 should take a particular action (e.g., identify a fitted sequence as a final sequence, operate a valve, report a final sequence to a user 451). When a sensor device 460 or a sensor device 360 includes its own controller (e.g., similar to the maintenance system controller 404 or portions thereof, similar to the MPMS controller 304 or portions thereof), then the sensor device 460 or the sensor device 360 may be considered a type of computer device, as discussed below with respect to FIG. 6.

A user 451 may be any person that interacts, directly or indirectly, with a controller 404, a controller 404, and/or any other component of the subsystem 499. Examples of a user 451 may include, but are not limited to, a business owner, an engineer, a company representative, a geologist, a consultant, a drilling engineer, a contractor, and a manufacturer's representative. A user 451 may use one or more user systems 455, which may include a display (e.g., a GUI). A user system 455 of a user 451 may interact with (e.g., send data to, obtain data from) the network manager 427, the MPMS controller 304, and/or the maintenance system controller 404 via an application interface and using the communication links 405. The user 451 may also interact directly with a controller 404 and/or a controller 404 through a user interface (e.g., keyboard, mouse, touchscreen).

The network manager 427 is a device or component that controls all or a portion (e.g., a communication network, the MPMS controller 304, the maintenance system controller 404) of the subsystem 499. The network manager 427 may be substantially similar to a controller (e.g., the MPMS controller 304, the maintenance system controller 404), or portions thereof, as described above. For example, the network manager 427 may include a controller that has one or more components and/or similar functionality to some or all of the MPMS controller 404. Alternatively, the network manager 427 may include one or more of a number of features in addition to, or altered from, the features of a controller (e.g., the MPMS controller 304, the maintenance system controller 404). As described herein, control and/or communication with the network manager 427 may include communicating with one or more other components of the subsystem 499 and/or another system. In such a case, the network manager 427 may facilitate such control and/or communication. The network manager 427 may be called by other names, including but not limited to a master controller, a network controller, and an enterprise manager. The network manager 427 may be considered a type of computer device, as discussed below with respect to FIG. 6.

Interaction between the MPMS controller 304, the maintenance system controller 404, the sensor devices 460, the sensor devices 360, the users 451 (including any associated user systems 455), the network manager 427, and other components of the subsystem 499 and/or a larger system may be conducted using communication links 405 and/or power transfer links 487. Each communication link 405 and each power transfer link 487 can be substantially the same as the communication links 305 and the power transfer links 387, respectively, discussed above.

FIG. 6 illustrates one embodiment of a computing device 618 that implements one or more of the various techniques described herein, and which is representative, in whole or in part, of the elements described herein pursuant to certain example embodiments. For example, the maintenance system controller 404 (including components thereof, such as a control engine 506, a hardware processor 521, a storage repository 531, a power module 530, and a transceiver 524) may be considered a computing device 618. The computing device 618 of FIG. 6 is one example of a computing device and is not intended to suggest any limitation as to scope of use or functionality of the computing device and/or its possible architectures. Neither should the computing device 618 of FIG. 6 be interpreted as having any dependency or requirement relating to any one or combination of components illustrated in the example computing device 618.

The computing device 618 includes one or more processors or processing units 614, one or more memory/storage components 615, one or more input/output (I/O) devices 616, and a bus 617 that allows the various components and devices to communicate with one another. The bus 617 represents one or more of any of several types of bus structures, including a memory bus or memory controller, a peripheral bus, an accelerated graphics port, and a processor or local bus using any of a variety of bus architectures. The bus 617 includes wired and/or wireless buses.

The memory/storage component 615 represents one or more computer storage media. The memory/storage component 615 includes volatile media (such as random access memory (RAM)) and/or nonvolatile media (such as read only memory (ROM), flash memory, optical disks, magnetic disks, and so forth). The memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a user 451 to enter commands and information to the computing device 618, and also allow information to be presented to the user 451 and/or other components or devices. Examples of input devices 616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 (also sometimes called a computer system 618) is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments. Further, one or more embodiments can be implemented on a distributed system having one or more nodes, where each portion of the implementation (e.g., the maintenance system controller 404) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 9A:
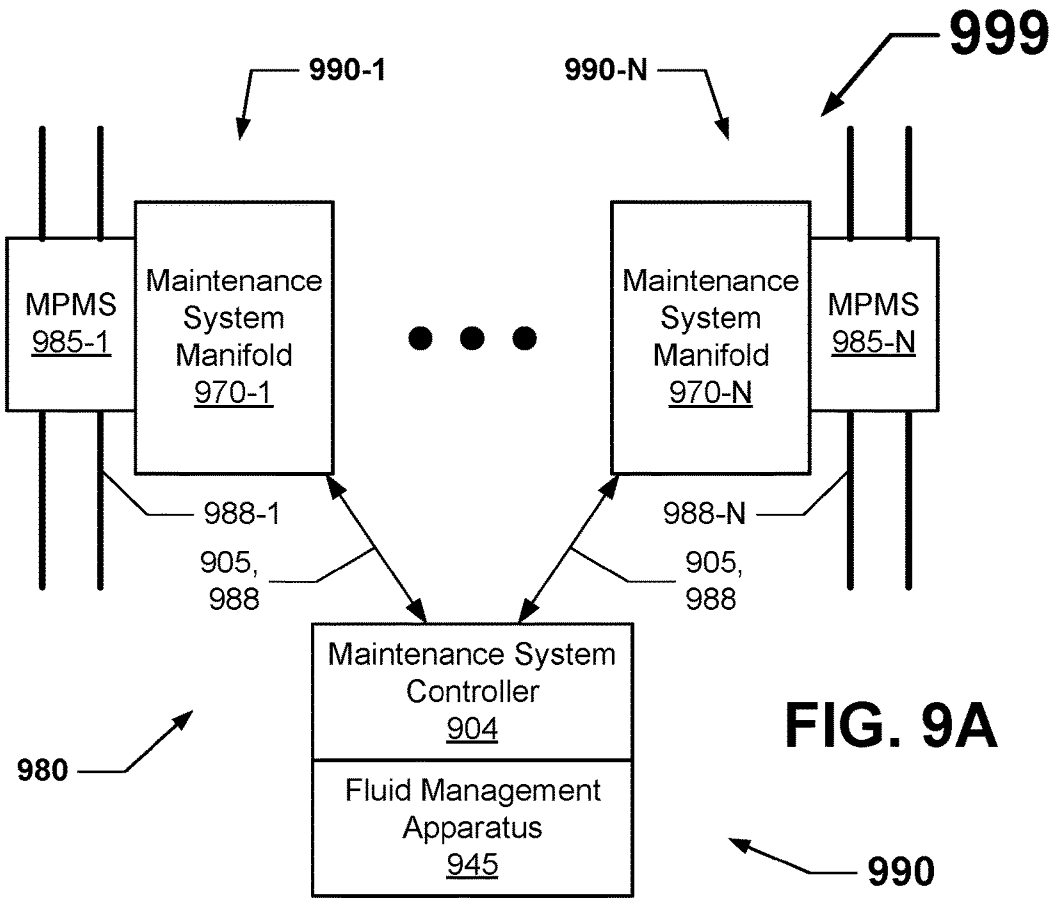
FIGS. 9A and 9B each shows a diagram of another subsystem that includes an example maintenance system for multiple MPMSs according to certain example embodiments.
Figure 9B:
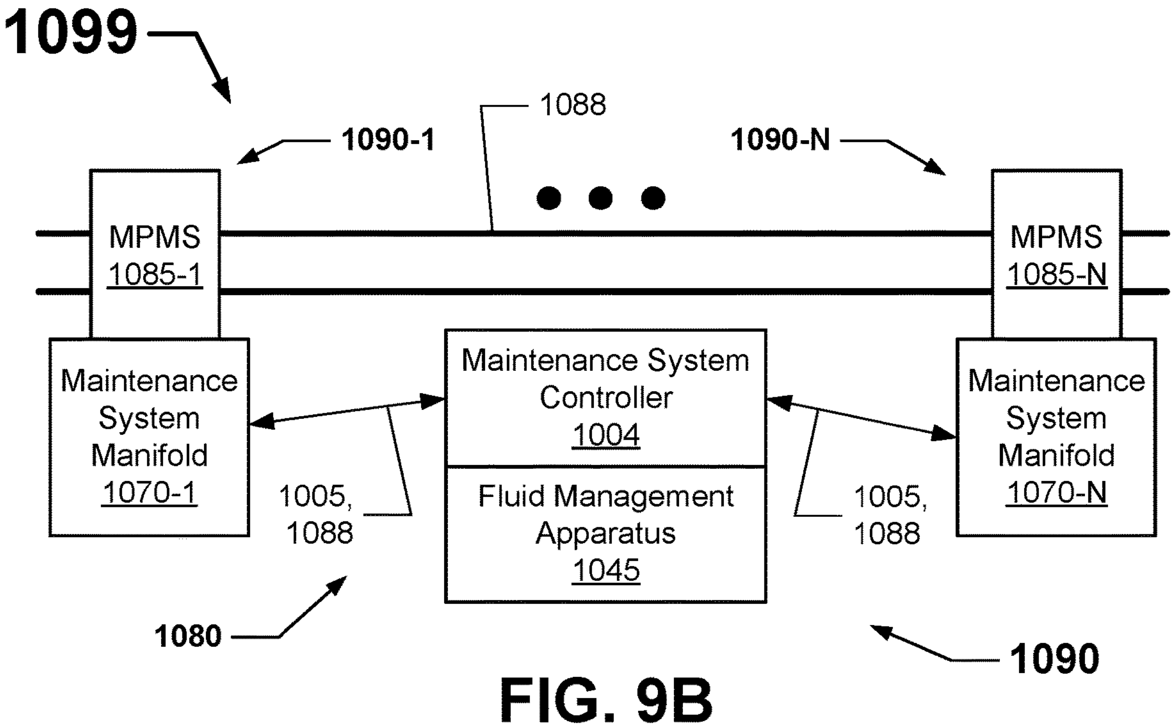

FIGS. 9A and 9B each shows a diagram of another subsystem that includes an example maintenance system for multiple MPMSs according to certain example embodiments. Specifically, FIG. 9A shows a diagram of another subsystem 999 that includes an example maintenance system 980 for multiple MPMSs 985 according to certain example embodiments. FIG. 9B shows a diagram of yet another subsystem 1099 that includes an example maintenance system 1080 for multiple MPMSs 1085 according to certain example embodiments. Referring to FIGS. 1 through 9B, each MPMS 985 and the maintenance system 980 (including its various components, such as the maintenance system controller 904, the fluid management apparatus 945, and each maintenance system manifold 970) of the subsystem 999 of FIG. 9A can be substantially the same as the MPMSs (e.g., MPMS 485) and the maintenance system 480 (including the maintenance system controller 404, the fluid management apparatus 445, and each maintenance system manifold 470) discussed above. The number of multiple MPMSs 985 can vary. In this case, there are N MPMSs 985 (MPMS 985-1 through MPMS 985-N). Each MPMS 985 has piping 988 that traverses therethrough. For example, piping 988-1 traverses through MPMS 985-1, and piping 988-N traverses through MPMS 985-N.

The example maintenance system 980 in this case has a fluid management apparatus 945, a maintenance system controller 904, and multiple maintenance system manifolds 970. The piping 988 and communication links 905 (similar to the piping and communication links discussed above) may exist between the fluid management apparatus 945, the maintenance system controller 904, and the maintenance system manifolds 970. In this case, there are N maintenance system manifolds 970 (maintenance system manifold 970-1 through maintenance system manifold 970-N). Each maintenance system manifold 970 is coupled to a MPMS 985 to form an integrated MPMS 990 (e.g., integrated MPMS 990-1 through integrated MPMS 990-N), where the fluid management apparatus 945 and the maintenance system controller 904 are shared between all of the integrated MPMSs 990. In this example, maintenance system manifold 970-1 is coupled to MPMS 985-1, and maintenance system manifold 970-N is coupled to MPMS 985-N. With such a configuration, the maintenance system 980 can share the resources of the fluid management apparatus 945 and the maintenance system controller 904 among multiple MPMSs 985 that are located substantially proximate to each other.

Each MPMS 1085 and the maintenance system 1080 (including its various components, such as the maintenance system controller 1004, the fluid management apparatus 1045, and each maintenance system manifold 1070) of the subsystem 1099 of FIG. 9B can be substantially the same as the MPMSs (e.g., MPMS 485) and the maintenance system 480 (including the maintenance system controller 404, the fluid management apparatus 445, and each maintenance system manifold 470) discussed above. The number of multiple MPMSs 1085 can vary. In this case, there are N MPMSs 1085 (MPMS 1085-1 through MPMS 1085-N). Each MPMS 1085 has piping 1088 that traverses therethrough. Specifically, one part of the piping 1088 traverses through MPMS 1085-1, and another part of the piping 1088 traverses through MPMS 1085-N, where the piping 1088 is continuous along the portion of its length shown in FIG. 9B.

The example maintenance system 1080 in this case has a fluid management apparatus 1045, a maintenance system controller 1004, and multiple maintenance system manifolds 1070. The piping 1088 and communication links 1005 (similar to the piping and communication links discussed above) may exist between the fluid management apparatus 1045, the maintenance system controller 1004, and the maintenance system manifolds 1070. In this case, there are N maintenance system manifolds 1070 (maintenance system manifold 1070-1 through maintenance system manifold 1070-N). Each maintenance system manifold 1070 is coupled to a MPMS 1085 to form an integrated MPMS 1090 (e.g., integrated MPMS 1090-1 through integrated MPMS 1090-N), where the fluid management apparatus 1045 and the maintenance system controller 1004 are shared between all of the integrated MPMSs 1090. In this example, maintenance system manifold 1070-1 is coupled to MPMS 1085-1, and maintenance system manifold 1070-N is coupled to MPMS 1085-N. With such a configuration, the maintenance system 1080 can share the resources of the fluid management apparatus 1045 and the maintenance system controller 1004 among multiple MPMSs 1085 that are located substantially proximate to each other.

Figure 10:
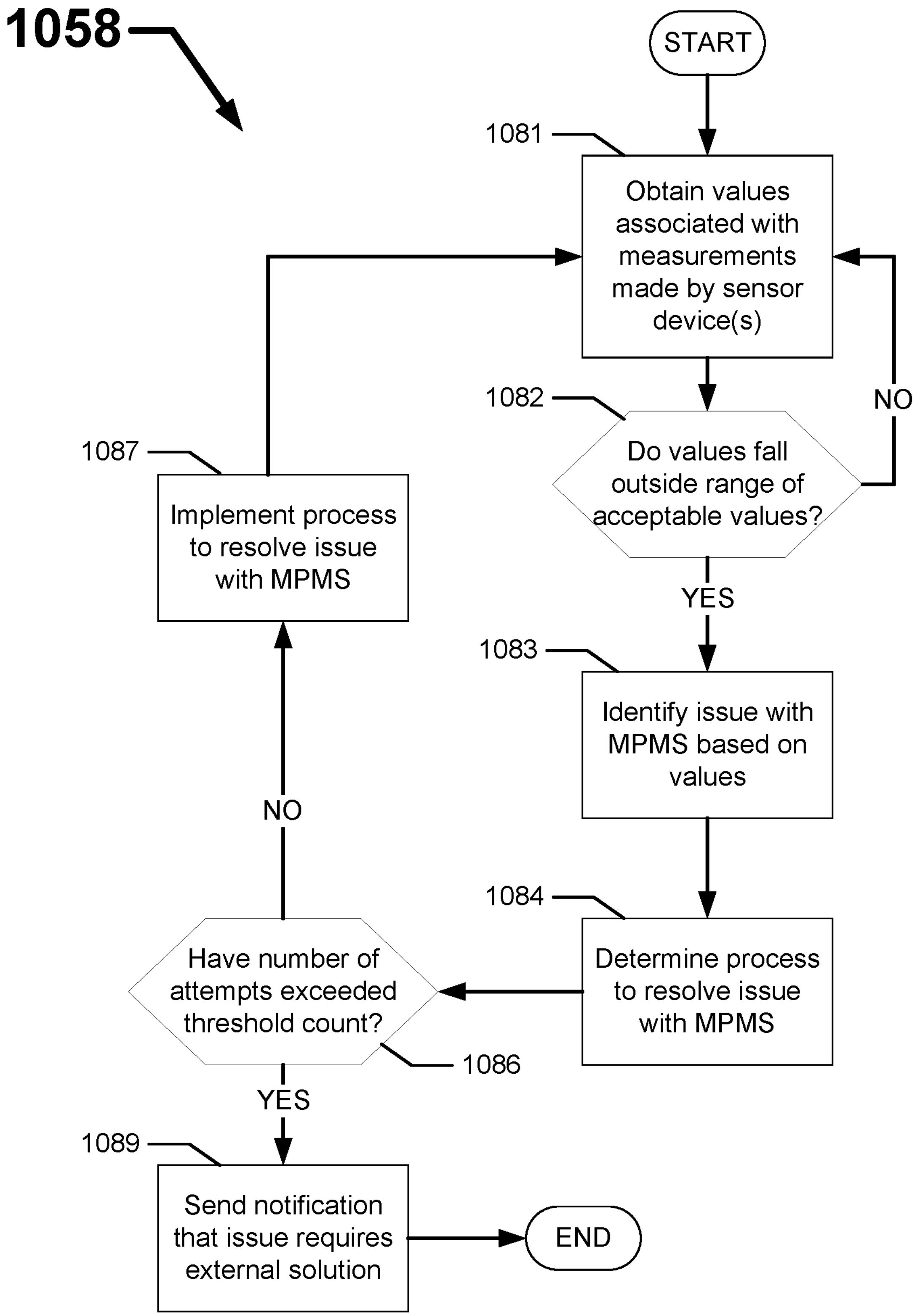
FIG. 10 shows a flowchart of a method for maintaining a MPMS according to certain example embodiments.

FIG. 10 shows a flowchart 1058 of a method for maintaining a MPMS 485 according to certain example embodiments. While the various steps in this flowchart 1058 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 10 may be included in performing this method. Accordingly, the specific arrangement of steps should not be construed as limiting the scope. Further, a particular computing device, such as the computing device 618 discussed above with respect to FIG. 6, may be used to perform or facilitate performance of one or more of the steps (or portions thereof) for the method shown in FIG. 10 in certain example embodiments. Any of the functions (or portions thereof) performed below by the maintenance system controller 404 may involve the use of one or more protocols 532, one or more algorithms 533, and/or stored data 534 stored in a storage repository 531. In addition, or in the alternative, any of the functions (or portions thereof) in the method may be performed by a user (e.g., user 451). In some cases, one or more of the various steps in the method of FIG. 10 can be performed automatically, as by the maintenance system controller 404 of the example maintenance system 480.

The method shown in FIG. 10 is merely an example that may be performed by using an example system described herein. In other words, systems for maintaining (e.g., a scheduled or routine cleaning, an unscheduled cleaning to remove a blockage) a MPMS 485 may perform other functions using other methods in addition to and/or aside from those shown in FIG. 10. Referring to FIGS. 1 through 10, the method shown in the flowchart 1058 of FIG. 10 begins at the START step and proceeds to step 1081, where values associated with measurements made by one or more of the sensor devices 460 are obtained. As used herein, the term "obtaining" may include receiving, retrieving, accessing, generating, etc. or any other manner of obtaining the information. The values may be associated with measurements of any of a number of parameters, including but not limited to flow rate, time, temperature, differential pressure, and pressure. The parameter may be associated with the operation of the MPMS 485 (or portion thereof). Some or all of the values may be measured by one or more sensor devices 460 of the MPMS 485. In addition, or in the alternative, some or all of the values may be calculated (e.g., by the MPMS controller 304 of the MPMS 485, by the network manager 427), filtered, and/or otherwise manipulated. The values may be continuous or discrete over a period of time (e.g., a second, a minute, an hour, a day, a month, a year).

The values may be obtained by the maintenance system controller 404 (or an obtaining component thereof, such as the control engine 506) of the maintenance system 480 using one or more algorithms 533, one or more protocols 532, stored data 534, the communication module 507, the transceiver 524, and/or the application interface 526. The values may be obtained from one or more sensor devices 460 of the MPMS 485. In addition, or in the alternative, the values may be obtained from the MPMS controller 304 of the MPMS 485. In addition, or in the alternative, the values may be obtained from a user 451, including an associated user system 455, and/or the network manager 427.

In some cases, the values are obtained following an implementation of a method or process to resolve the issue with the MPMS 485 from step 1087. In such cases, the evaluation module 552 of the maintenance system controller 404 of the example maintenance system 480 may be configured to evaluate the effectiveness of the treatment that was implemented by the implementation module 538 using the values that are obtained. In order to evaluate a treatment implemented by the implementation module 538 using the values, the evaluation module 552 can use one or more protocols 532, one or more algorithms 533, and/or stored data 534.

For example, the values associated with measurements taken after an attempted treatment can be compared with expected values in a table (part of the stored data 534) that list a range of acceptable values when a blockage has been cleared and/or some other problem with the MPMS 485 has been resolved. If the values (or an output of a model that uses the values as inputs) continue to fall outside the range of acceptable values in the table, then the evaluation module 552 may determine that the values indicate that the method just implemented was not successful in resolving the issue with the MPMS 485. In the event that a discrepancy arises between actual results and expected results, the control engine 506 can adjust one or more of the algorithms 533, one or more of the protocols 532, and/or some of the stored data 534 used by the evaluation module 552 as part of a self-correcting or self-learning function.

As an example of the process that the evaluation module 552 can follow in evaluate the effectiveness of the treatment of the issue with the MPMS 485 that was implemented by the implementation module 538, the evaluation module 552 may evaluate (using the values obtained in step 1081) the method or process to resolve the issue with the MPMS 485 as the method is being implemented, compare actual results of the method with expected results, determine, based on comparing the actual results with the expected results, that the issue is not resolved using the method, and modify the method for future implementation (e.g., in the next iteration).

In step 1082, a determination is made as to whether the values fall outside a range of acceptable values. In other words, a determination is made as to whether an issue with the MPMS 485 is identified. The determination can be made by the detection module 536 of the maintenance system controller 404 of the maintenance system 480 using one or more algorithms 533, one or more protocols 532, and/or stored data 534. The range of acceptable values can be listed in one or more tables (stored data 534) and/or output from a model (a form of algorithm 533). If the values fall outside a range of acceptable values, there is an issue (e.g., an obstruction, such as a blockage) with the MPMS 485, and the process proceeds to step 1083. If the values do not fall outside a range of acceptable values, there is no issue (e.g., an obstruction, such as a blockage) with the MPMS 485, and the process reverts to step 1081.

In step 1083, an issue with the MPMS 485 is identified based on the values. The issue with the MPMS 485 may be identified by the detection module 536 of the maintenance system controller 404 of the maintenance system 480 using one or more algorithms 533, one or more protocols 532, and/or stored data 534. An issue identified by the detection module 536 can be broad. For example, the detection module 536 may only determine that there is some blockage within the MPMS 485. Alternatively, an issue identified by the detection module 536 can be more specific. For example, the detection module 536 may determine a particular component or part of the MPMS 485 that is experiencing blockage, how severe the blockage is, and/or how quickly the blockage is increasing over time.

As an example of the process that the detection module 536 can follow in identifying an issue with the MPMS 485, the detection module 536 may compare the current values of the parameter against historical values of the parameter, determine that the current values fall outside a range of acceptable values that are based on the historical values of the parameter, identify a subset of the historical values having a similar range to the current values, and identify a prior issue with the MPMS 485 that is associated with the subset of historical values as the issue. The detection module 536 can also compare the values received from the control engine 506 with historical values to help the detection module 536 identify the issue, including particulars thereof, with the MPMS 485. In the event that a discrepancy arises between actual results and expected results, the control engine 506 can adjust one or more of the algorithms 533, one or more of the protocols 532, and/or some of the stored data 534 used by the detection module 536 as part of a self-correcting or self-learning function.

In step 1084, a method or process to resolve the issue with the MPMS 485 is determined. In certain example embodiments, the categorization module 537 of the maintenance system controller 404 of the maintenance system 480 may be configured to determine the method to be used to attempt to resolve the issue with the MPMS 485. The categorization module 537 may categorize the issue based, at least in part, on the output of the detection module 536. The categorization module 537 can use one or more protocols 532, one or more algorithms 533, and/or stored data 534 to categorize the issue.

For example, if the issue detected by the detection module 536 is a sudden blockage at the distal end of the Venturi chamber of the MPMS 485, the categorization module 537 can determine, based on the applicable protocols 532, algorithms 533, and/or stored data 534, that the issue requires urgent and aggressive treatment. As another example, if the issue detected by the detection module 536 is a sudden blockage at a pressure channel of the MPMS 485, the categorization module 537 can determine, based on the applicable protocols 532, algorithms 533, and/or stored data 534, that the issue requires urgent and aggressive treatment. As yet example, if the issue detected by the detection module 536 is a sudden blockage at the meter chamber and/or a flow channel of the MPMS 485, the categorization module 537 can determine, based on the applicable protocols 532, algorithms 533, and/or stored data 534, that the issue requires urgent and aggressive treatment.

In addition to categorizing the urgency or priority of a current issue with the MPMS 485, the categorization module 537 may assess how the issue should be treated. For example, the categorization module 537 may determine which fluids 748 are available in the fluid management apparatus 445, the quantity of those fluids 748, the capabilities of the fluid injection system 747 associated with each fluid 748, and/or other information that would allow the categorization module 537 to identify potential treatments to address the issue. With this information, the categorization module 537 may use one or more protocols 532, one or more algorithms 533, and/or stored data 534 to identify the best treatment option to attempt to resolve the issue. In the event that a discrepancy arises between actual results and expected results, the control engine 506 can adjust one or more of the algorithms 533, one or more of the protocols 532, and/or some of the stored data 534 used by the categorization module 537 as part of a self-correcting or self-learning function.

In some cases, the method or process to resolve the issue with the MPMS 485 can be based, at least in part, on prior attempts to resolve the same issue. For example, if a third attempt is being made to resolve the issue, and the exact same method (e.g., in terms of the one or more fluids 748 used, in terms of a pressure or flow rate or a volume/mass/quantity of the one or more fluids 748, in terms of the temperature of the one or more fluids 748, in terms of the duration of the prior attempt) was used the first two times, then the categorization module 537 may alter one or more factors in the third attempt so that the third attempt to resolve the issue may be successful. Changing at least one factor in a subsequent attempt relative to a prior attempt may result in the subsequent attempt being referred to as an alternative method or attempt.

As an example of the process that the categorization module 537 can follow in determining the method or process to resolve the issue with the MPMS 485, the categorization module 537 may identify a prior method used to solve a historical issue with the MPMS 485 similar to the issue, evaluate the prior method, and determine, based on evaluating the prior method, that the prior method is repeated as the method or process to resolve the issue with the MPMS 485. As another example of the process that the categorization module 537 can follow in determining the method or process to resolve the issue with the MPMS 485, the categorization module 537 may identify a prior method used to solve a historical issue with the MPMS 485 similar to the issue, evaluate the prior method, determine, based on evaluating the prior method, that the prior method is ineffective, and modify the prior method to establish the method or process to resolve the issue with the MPMS 485.

In step 1086, a determination is made as to whether a number of attempts to resolve the issue with the MPMS 485 exceeds a threshold count value. The determination can be made by the control engine 506 of the maintenance system controller 404 of the maintenance system 480 using one or more algorithms 533, one or more protocols 532, and/or stored data 534. The threshold count value (e.g., zero, one, two, three, four, five) can be part of the stored data 534. If the number of attempts to resolve the issue with the MPMS 485 exceeds the threshold count value, then the efforts of the example maintenance system 480 have been unsuccessful, and the process proceeds to step 1089. If the number of attempts to resolve the issue with the MPMS 485 do not exceed the threshold count value, then the example maintenance system 480 can try (in a first attempt) or try again (in a repeat attempt) to resolve the issue, and the process proceeds to step 1087.

In step 1087, the method or process to resolve the issue with the MPMS 485 is implemented. In certain example embodiments, the implementation module 538 of the maintenance system controller 404 of the maintenance system 480 may be configured to implement the method (e.g., the treatment option identified by the categorization module 537) in an attempt to resolve the issue with the MPMS 485. In some cases, the implementation module 538 may directly control the appropriate components (or portions thereof) of one or more of the fluid injection systems 747 of the fluid management apparatus 445 of the maintenance system 480 in order to implement the method.

If the fluid management apparatus 445 includes an optional controller 704, then the implementation module 538 may direct the controller 704 to control the one or more of the fluid injection systems 747 of the fluid management apparatus 445. The implementation module 538 may use one or more protocols 532, one or more algorithms 533, and/or stored data 534 in performing its function of implementing the treatment option in an attempt to resolve the issue with the MPMS 485.

In some cases, implementation of a method or process to resolve the issue with the MPMS 485 can include determining (e.g., using values derived from measurements made by one or more of the sensor devices 760) that a fluid source 746 of the fluid management apparatus 445 is becoming empty with a fluid 748. In such cases, the implementation module 538 may be configured to communicate with the optional local controller 704 to receive such information and facilitate resupplying the fluid source 746 with additional amounts of the fluid 748. For example, the implementation module 538 may be configured to send a notification (e.g., to the network manager 427, to a user system 455 of a user 451) to obtain an additional quantity of the fluid 748. As another example, the implementation module 538 can submit an order with a vendor to purchase and deliver additional quantities of the fluid 748.

In some cases, implementation of a method or process to resolve the issue with the MPMS 485 can include handling the return fluid 757 that results from flowing the one or more fluids 748 into the MPMS 485 to sweep away elements (e.g., rock, sand, scale, proppant, hydrate, paraffin, gel, chemicals, debris, ice) that may be causing the blockages and/or other conditions within the MPMS 485 that result in the issue being resolved. In such cases, the implementation module 538 may be further configured to directly control the appropriate components (or portions thereof) of one or more of the return fluid conveyance systems 742 of the fluid management apparatus 445 of the maintenance system 480 in order to implement the method by clearing the return fluid 757 from the MPMS 485.

If the fluid management apparatus 445 includes an optional controller 704, then the implementation module 538 may direct the controller 704 to control the one or more of the return fluid conveyance systems 742 of the fluid management apparatus 445 to clear the return fluid 757 from the MPMS 485. In some cases, the implementation module 538 may also be configured to monitor and facilitate emptying (e.g., fully, partially) one or more of the collection vessels 741 of one or more of the return fluids 757. In the event that a discrepancy arises between actual results and expected results, the control engine 506 can adjust one or more of the algorithms 533, one or more of the protocols 532, and/or some of the stored data 534 used by the implementation module 538 as part of a self-correcting or self-learning function. When step 1087 is complete, the process reverts to step 1081.

In step 1089, a notification that the issue requires an external solution is sent. The notification can be sent by the control engine 506 of the maintenance system controller 404 of the maintenance system 480 using one or more algorithms 533, one or more protocols 532, stored data 534, the communication module 507, the transceiver 524, and/or the application interface 526. The notification can be sent to the network manager 427, one or more users 451 (including any associated user systems 455), and/or any other component of a system (e.g., system 100, system 300). The notification can be generic, stating merely that manual maintenance (e.g., cleaning, unclogging) of the MPMS 485 is needed. Alternatively, the notification can be detailed. For example, the notification can include such information as how many attempts were made by the maintenance system 480 to maintain the MPMS 485, when and for how long each attempt occurred, what fluids 748 were used, and under what conditions (e.g., pressure, flow rate, temperature) each fluid 748 was introduced to the MPMS 485. When step 1089 is complete, the process proceeds to the END step.

Figure 11A:
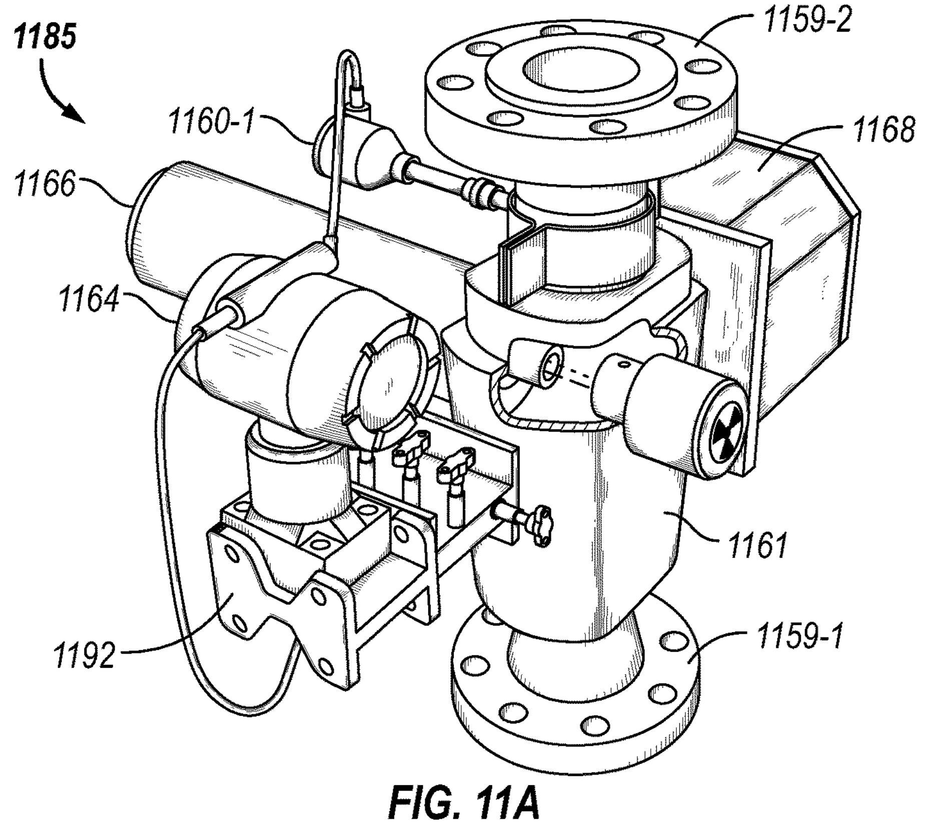
FIGS. 11A and 11B show a perspective view and an exploded view, respectively, of a MPMS that can host an example maintenance system according to certain example embodiments.
Figure 11B:
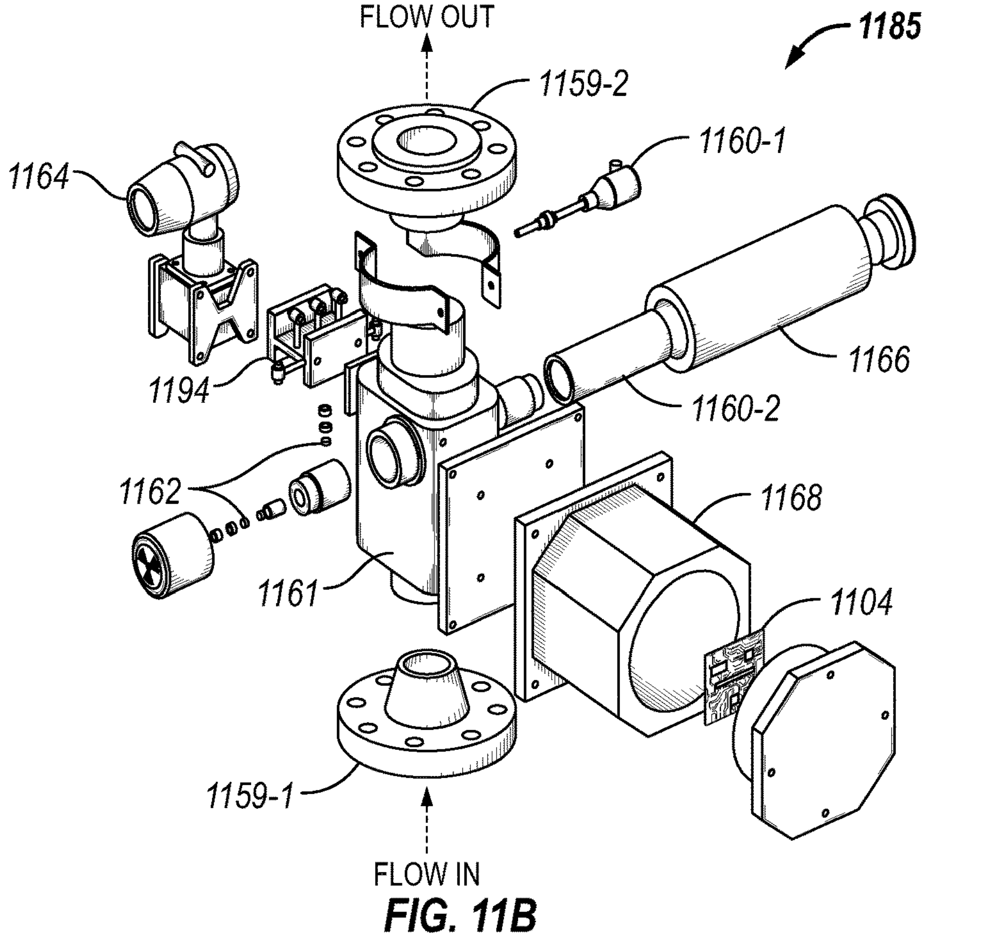

FIGS. 11A and 11B show a perspective view and an exploded view, respectively, of a MPMS 1185 that can host an example maintenance system according to certain example embodiments. Referring to FIGS. 1 through 11B, the MPMS 1185 of FIGS. 11A and 11B includes a Venturi chamber 1161, a radioactive source 1162, a DBB valve 1194, a multi-variable transmitter 1164, a MPMS controller 1104 (e.g., a flow computer), a sensor device 1160-1 (e.g., a temperature transmitter), a detector sleeve 1166, another sensor device 1160-2 (e.g., a gamma detector), a junction box 1168, a lower flange 1159-1, an upper flange 1159-2, and an external interface 1192. The upper flange 1159-2 and the lower flange 1159-1 may be configured to couple to piping (e.g., piping 488). The external interface 1192 may be configured to couple to a maintenance system manifold (e.g., maintenance system manifold 470) of an example maintenance system (e.g., maintenance system 480).

Any methods discussed herein for maintaining a MPMS may be performed entirely by a controller (e.g., controller 404) of the maintenance system (e.g., maintenance system 480) of an integrated MPMS (e.g., integrated MPMS 490). For example, a non-transitory computer readable medium comprising computer readable program code, which when executed by a computer processor, may enable the computer processor to: facilitate obtaining a plurality of values associated with a plurality of measurements of a parameter made by a sensor device, wherein the parameter is associated with operation of the MPMS; facilitate identifying, based on the plurality of values, an issue with the MPMS; facilitate determining a method or process to resolve the issue with the MPMS; and facilitate implementing the method or process to resolve the issue with the MPMS using a fluid management apparatus coupled to the MPMS.

When a method for maintaining a MPMS is implemented according to certain example embodiments, an alternative process can be determined and implemented if the initial process does not resolve an issue with the MPMS. In such cases, the alternative process can include a fluid, a flow rate, and/or a duration that is different from what is used in the initial process. When a method for maintaining a MPMS is implemented according to certain example embodiments, a sensor device that is used to measure values of a parameter associated with the operation of the MPMS may be part of the MPMS.

In some cases, when a method for maintaining a MPMS is implemented according to certain example embodiments, the method can include determining that a quantity of the fluid is running low, and sending a notification to obtain an additional quantity of the fluid. In some cases, when a method for maintaining a MPMS is implemented according to certain example embodiments, the method can include determining that a collection vessel of the fluid management apparatus is becoming full of the return fluid, and facilitating vacating the collection vessel of the return fluid. In some cases, when a method for maintaining a MPMS is implemented according to certain example embodiments, the process to resolve an issue with the MPMS may be implemented while the MPMS remains connected to production piping.

In some cases, when a method for maintaining a MPMS is implemented according to certain example embodiments, identifying the issue with the MPMS can include comparing the plurality of values against historical values of the parameter; determining that the plurality of values fall outside a range of acceptable values that are based on the historical values of the parameter; identifying a subset of the historical values having a similar range to the plurality of values; and identifying a prior issue with the MPMS that is associated with the subset of historical values as the issue.

In some cases, when a method for maintaining a MPMS is implemented according to certain example embodiments, the method can include evaluating the process to resolve the issue with the MPMS as the method is being implemented; comparing actual results of the process with expected results; determining, based on comparing the actual results with the expected results, that the issue is not resolved using the process; and modifying the process for future implementation.

In some cases, when a system for maintaining a MPMS is implemented according to certain example embodiments, the system can include a fluid management apparatus that includes a collection vessel, where the collection vessel includes a vent port to allow excess waste fluid to be expelled from the collection vessel. In some cases, when a system for maintaining a MPMS is implemented according to certain example embodiments, the system can include a maintenance system manifold that includes a plurality of valves to control a flow of a fluid and a return fluid through piping in the maintenance system manifold.

Example embodiments may be used to maintain (e.g., clear a blockage, provide a routine cleaning) a MPMS. Example embodiments may be used to fully or partially automate the process of identifying issues with the MPMS in real time as they arise using measurements made by sensor devices of the MPMS. Example maintenance systems are coupled to the MPMS and can identify issues, determine an optimal strategy, and implement the strategy in real time to resolve the issue with the MPMS. Example embodiments can also evaluate the effectiveness of the implemented strategy and revise the strategy for a subsequent implementation if the prior strategy was ineffective. Example embodiments can generate and send a notification in real time if multiple efforts to resolve the issue are ineffective. Example maintenance systems can be used with new MPMSs or retrofit with existing MPMSs with little or no modification to the existing MPMS. Example embodiments may provide a number of other benefits. Such benefits may include, but are not limited to, case of use, modularity, extending the life and/or information stream of a producing well without down time due to a non-functioning MPMS, flexibility, configurability, responsiveness, savings in cost, less risk to people and equipment, less impact to the environment, and improved compliance with applicable industry standards and regulations.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for maintaining a multiphase metering system (MPMS), the method comprising:

obtaining, in real time, a plurality of values associated with a plurality of measurements of a parameter made by a sensor device, wherein the parameter is associated with operation of the MPMS;

identifying, in real time and based on the plurality of values, an issue with functionality of the MPMS during the operation of the MPMS, wherein the issue is associated with an obstruction within the MPMS;

determining, in real time, a process to resolve the issue with the functionality of the MPMS during the operation of the MPMS; and implementing, in real time and using an implementation module, the process to resolve the issue with the functionality of the MPMS using a fluid management apparatus to facilitate movement of a fluid from the fluid management apparatus through a maintenance system manifold to the MPMS to clear the obstruction within the MPMS, wherein the maintenance system manifold is coupled to an external interface of the MPMS, and wherein the fluid management apparatus is coupled to the maintenance system manifold.

2. The method of claim 1, further comprising:

obtaining a plurality of additional values associated with a plurality of additional measurements of the parameter made by the sensor device;

determining, based on the plurality of additional values, that the issue with the functionality of the MPMS continues to exist;

determining an alternative process to resolve the issue with the functionality of the MPMS; and implementing the alternative process to resolve the issue with the functionality of the MPMS using the fluid management apparatus coupled to the MPMS.

3. The method of claim 2, further comprising:

determining that the issue with the functionality of the MPMS remains unresolved after implementing the alternative process; and sending a notification that identifies the issue with the functionality of the MPMS and that the issue is not being resolved using the fluid management apparatus, wherein the notification is sent after a number of unsuccessful attempts to resolve the issue with the functionality of the MPMS using the fluid management apparatus exceeds a threshold count value.

4. The method of claim 1, wherein the parameter comprises at least one of a group consisting of a pressure, a temperature, a flow rate, time, and a differential pressure.

5. The method of claim 1, wherein the issue involves at least one of a group consisting of a line in the MPMS, a nozzle of the MPMS, a channel in the MPMS, and a taphole of the MPMS.

6. The method of claim 1, wherein the process to resolve the issue with the functionality of the MPMS is implemented without interrupting production operations.

7. The method of claim 1, wherein implementing the process further comprises facilitating movement of a return fluid from the MPMS through the maintenance system manifold to the fluid management apparatus.

8. The method of claim 1, wherein determining the process to resolve the issue with the functionality of the MPMS comprises:
- identifying a prior process used to solve a prior issue with the functionality of the MPMS;
- evaluating the prior process; and
- determining, based on evaluating the prior process, that the prior process is repeated as the process to resolve the issue with the functionality of the MPMS.

9. The method of claim 1, wherein determining the process to resolve the issue with the functionality of the MPMS comprises:
- identifying a prior process used to solve a prior issue with the functionality of the MPMS;
- evaluating the prior process;
- determining, based on evaluating the prior process, that the prior method is ineffective; and
- modifying the prior process to establish the process to resolve the issue with the functionality of the MPMS.

10. A system for managing a multiphase metering system (MPMS), the system comprising:
- a maintenance system manifold comprising a MPMS interface;
- a fluid management apparatus configured to provide a fluid; and
- a maintenance system controller configured to:
  - obtain, in real time, a plurality of values associated with a plurality of measurements of a parameter made by a sensor device, wherein the parameter is associated with operation of the MPMS;
  - identify, in real time and based on the plurality of values, an issue with functionality of the MPMS, wherein the issue is associated with an obstruction within the MPMS;
  - determine, in real time, a method to resolve the issue with the functionality of the MPMS; and
  - implement, in real time, the method to resolve the issue with the functionality of the MPMS using the fluid management apparatus to facilitate movement of the fluid from the fluid management apparatus through the maintenance system manifold to the MPMS to clear the obstruction within the MPMS, wherein the MPMS interface of the maintenance system manifold is coupled to an external interface of the MPMS, and wherein the fluid management apparatus is coupled to the maintenance system manifold.

11. The system of claim 10, wherein the fluid management apparatus comprises a fluid source and a fluid injection system to deliver the fluid to the maintenance system manifold, and wherein the fluid injection system is communicably coupled to the maintenance system controller.

12. The system of claim 11, wherein the fluid management apparatus further comprises an additional fluid source and an additional fluid injection system to deliver an additional fluid to the maintenance system manifold, and wherein the additional fluid injection system is communicably coupled to the maintenance system controller.

13. The system of claim 12, wherein the fluid management apparatus further comprises a fluid mixing apparatus that is configured to mix the fluid and the additional fluid to generate a mixed fluid, wherein the mixed fluid is delivered to the maintenance system manifold.

14. The system of claim 11, wherein the fluid source is configured to be refillable with an additional amount of the fluid.

15. The system of claim 10, wherein the fluid management apparatus further comprises a second sensor device for measuring a second parameter associated with the fluid, and wherein measurements made by the second sensor device are used by the maintenance system controller to implement the method to resolve the issue with the functionality of the MPMS.

16. The system of claim 10, wherein the fluid management apparatus comprises a collection vessel and a waste fluid conveyance system to deliver a waste fluid from the MPMS, via the maintenance system manifold, to the collection vessel, and wherein the waste fluid conveyance system is communicably coupled to the maintenance system controller.

17. The system of claim 10, wherein the MPMS interface is further configured to deliver a fluid to and receive a waste fluid from the MPMS.

18. The system of claim 17, wherein the maintenance system manifold is further configured to receive the fluid from and deliver the waste fluid to the fluid management apparatus.

19. An integrated multiphase metering and maintenance system, the system comprising:
- a multiphase metering system (MPMS) configured to measure single-phase or multiple-phase flow, wherein the MPMS comprises:
  - a sensor device; and
  - an external interface; and
- a maintenance system coupled to the MPMS, wherein the maintenance system comprises:
  - a maintenance system manifold comprising a MPMS interface coupled to the external interface of the MPMS;
  - a fluid management apparatus configured to provide a fluid, wherein the fluid management apparatus is coupled to the maintenance system manifold; and
  - a maintenance system controller configured to:
    - obtain, in real time, a plurality of values associated with a plurality of measurements of a parameter made by the sensor device of the MPMS, wherein the parameter is associated with operation of the MPMS, wherein the issue is associated with an obstruction within the MPMS;
    - identify, in real time and based on the plurality of values, an issue with functionality of the MPMS;
    - determine, in real time, a method to resolve the issue with the functionality of the MPMS; and
    - implement, in real time and using an implementation module, the method to resolve the issue with the functionality of the MPMS using the fluid management apparatus to facilitate movement of the fluid from the fluid management apparatus through the maintenance system manifold to the MPMS to clear the obstruction within the MPMS.

20. The method of claim 1, further comprising:
- obtaining, in real time, a second plurality of values associated with a second plurality of measurements of the parameter made by a second sensor device, wherein the parameter is associated with operation of a second MPMS;

identifying, in real time and based on the second plurality of values, a second issue with functionality of the second MPMS during the operation of the second MPMS, wherein the second issue is associated with a second obstruction within the second MPMS;

determining, in real time, a second process to resolve the second issue with the functionality of the second MPMS during the operation of the second MPMS; and implementing, in real time, the second process to resolve the second issue with the functionality of the second MPMS using the fluid management apparatus to facilitate movement of a second fluid, using the implementation module, from the fluid management apparatus through a second maintenance system manifold to the second MPMS to clear the second obstruction within the second MPMS, wherein the second maintenance system manifold is coupled to a second external interface of the second MPMS, and wherein the fluid management apparatus is coupled to the second maintenance system manifold.

* * * * *